US008065430B2

(12) United States Patent
Murakami et al.

(10) Patent No.: US 8,065,430 B2
(45) Date of Patent: Nov. 22, 2011

(54) STORAGE SYSTEM AND LOGICAL UNIT CHECKING METHOD FOR THE SAME

(75) Inventors: Toshihiko Murakami, Fujisawa (JP); Makio Mizuno, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1410 days.

(21) Appl. No.: 11/580,148

(22) Filed: Oct. 13, 2006

(65) Prior Publication Data

US 2008/0126663 A1 May 29, 2008

(30) Foreign Application Priority Data

Aug. 11, 2006 (JP) ................................ 2006-219822

(51) Int. Cl.
*G06F 15/16* (2006.01)
(52) U.S. Cl. ......... 709/235; 709/230; 709/237; 709/238
(58) Field of Classification Search .................. 709/230, 709/235, 237, 238
See application file for complete search history.

(56) References Cited

U.S. PATENT DOCUMENTS

| 7,814,218 B1* | 10/2010 | Knee et al. ................... 709/230 |
| 2004/0199808 A1* | 10/2004 | Freimuth et al. ................. 714/4 |
| 2005/0132099 A1* | 6/2005 | Honma ........................... 710/15 |

FOREIGN PATENT DOCUMENTS

JP  2005-174097  12/2003

OTHER PUBLICATIONS

R. Braden, Editor, "Requirements for Internet Hosts—Communication Layers", Network Working Group, Oct. 1989, pp. 1-106.

* cited by examiner

*Primary Examiner* — Djenane Bayard
(74) *Attorney, Agent, or Firm* — Foley & Lardner LLP

(57) ABSTRACT

In a situation where a host computer or storage system is an initiator and the storage system or another storage system is a target, when the initiator intends to check LUs in the target, if the initiator judges that the number of delay ACKs is set to more than one, it simultaneously issues the same number of check commands—SCSI Inquiry LUN#a and LUN#b—as the number of delayed ACKs, or check commands in multiples of the number of delayed ACK, to the target; and, when receiving check results—SCSI Data-In—in response to the check commands from the target, sends an acknowledgement to the target. Accordingly, when the number of delayed ACKs set in the TCP in the initiator is more than one, the initiator simultaneously issues check commands to the target designating the same number of LUs as the number of delayed ACKs, and the responses will not be influenced by the delayed ACK.

23 Claims, 24 Drawing Sheets

FIG.4
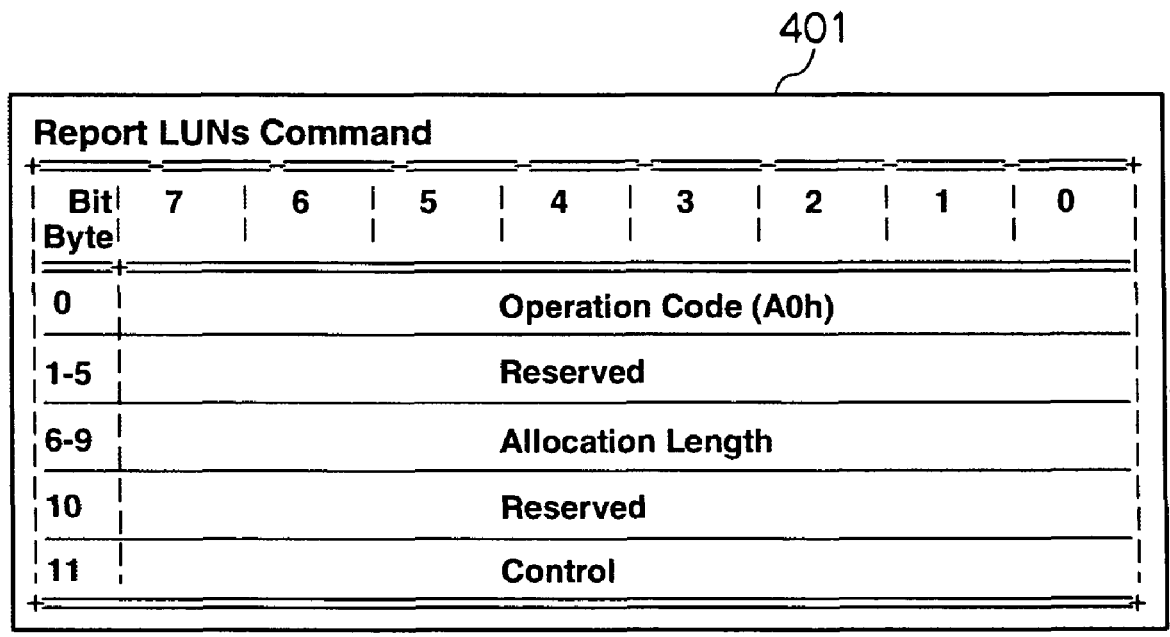
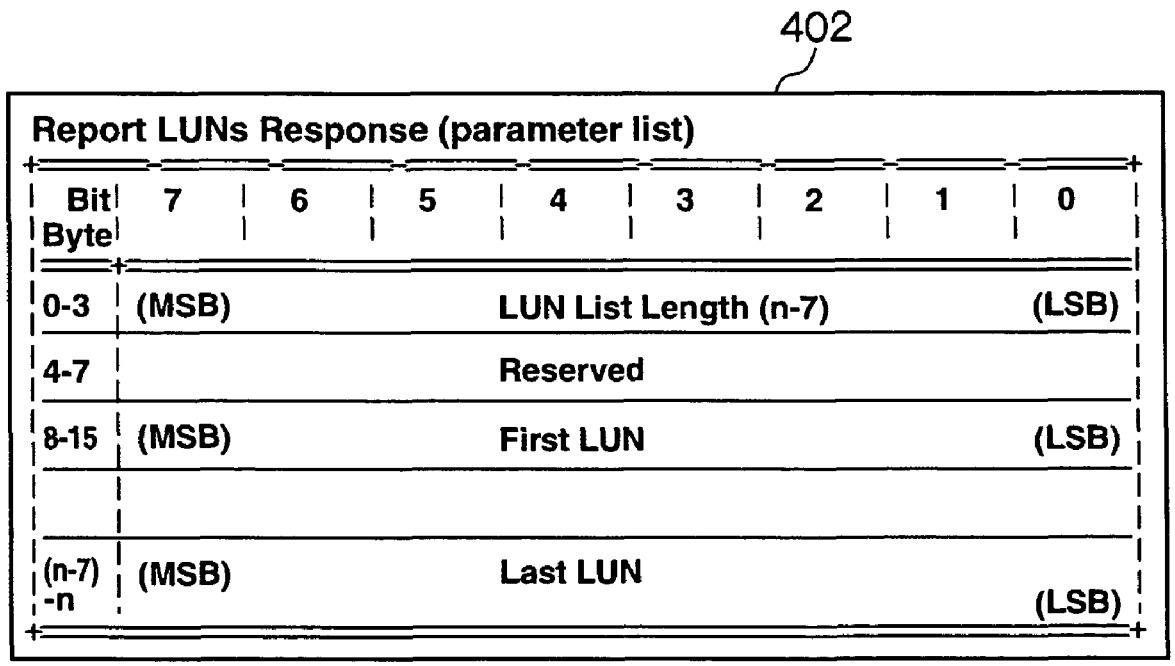

FIG.8
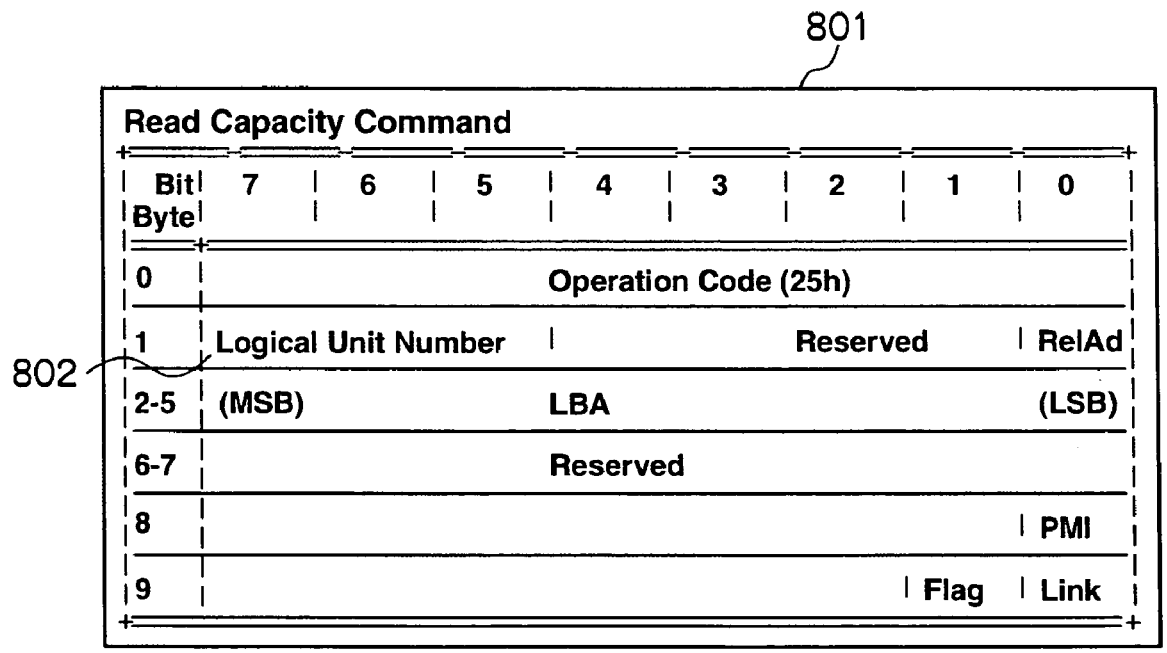
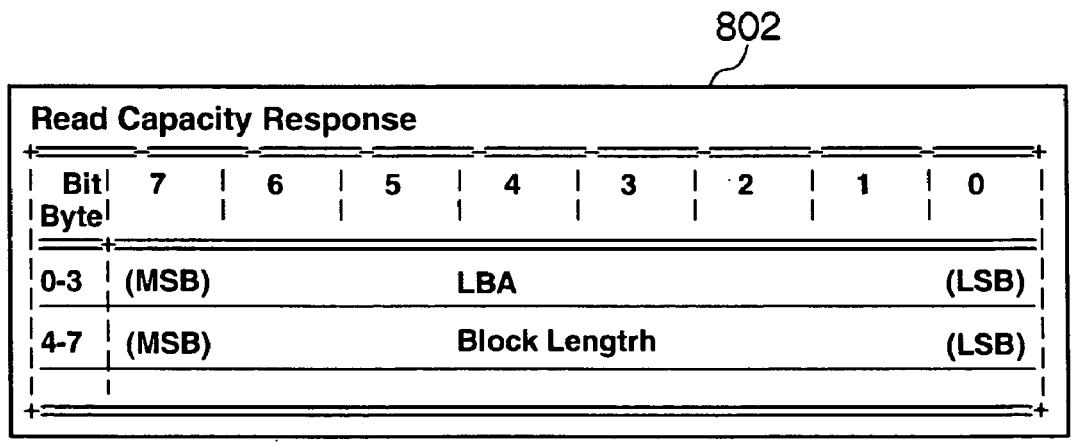

FIG.14

| LU NUMBER (LUN) 1101 | VENDOR IDENTIFIER 1102 | PRODUCT IDENTIFIER 1103 | PRODUCT REVISION NUMBER 1104 | CAPACITY [BYTE] 1105 | DEVICE IDENTIFIER 1106 | UNIT SERIAL NUMBER 1107 |
|---|---|---|---|---|---|---|
| 0 | AAA | RAID5 | 0201 | 20GB | iSCSI RAID | SN01001 |
| 1 | AAA | RAID5 | 0201 | 20GB | iSCSI RAID | SN01002 |
| 2 | AAA | RAID5 | 0201 | 20GB | iSCSI RAID | - |
| 5 | BBB | RAID0 | 0102 | 40GB | - | PSN02001 |
| 6 | BBB | RAID0 | 0102 | 40GB | iSCSI GW | NUM003002 |
| | | | | | | |
| | | | | | | |

| LU NUMBER (LUN) 1101 | VENDOR IDENTIFIER 1102 | PRODUCT IDENTIFIER 1103 | PRODUCT REVISION NUMBER 1104 | CAPACITY [BYTE] 1105 | DEVICE IDENTIFIER 1106 | UNIT SERIAL NUMBER 1107 |
|---|---|---|---|---|---|---|
| 0 | AAA | RAID5 | 0201 | 20GB | iSCSI RAID | SN01001 |
| 1 | AAA | RAID5 | 0201 | 20GB | iSCSI RAID | SN01002 |
| 2 | AAA | RAID5 | 0201 | 20GB | iSCSI RAID | - |
| 5 | BBB | RAID0 | 0102 | 40GB | - | PSN02001 |
| 6 | BBB | RAID0 | 0102 | 40GB | iSCSI GW | NUM003002 |
| | | | | | | |
| | | | | | | |

FIG.20

| LU NUMBER (LUN) 1101 | VENDOR IDENTIFIER 1102 | PRODUCT IDENTIFIER 1103 | PRODUCT REVISION NUMBER 1104 | CAPACITY [BYTE] 1105 | DEVICE IDENTIFIER 1106 | UNIT SERIAL NUMBER 1107 |
|---|---|---|---|---|---|---|
| 0 | AAA | RAID5 | 0201 | 20GB | iSCSI RAID | SN01001 |
| 1 | AAA | RAID5 | 0201 | 20GB | iSCSI RAID | SN01002 |
| 2 | AAA | RAID5 | 0201 | 20GB | iSCSI RAID | - |
| 5 | BBB | RAID0 | 0102 | 40GB | - | PSN02001 |
| 6 | BBB | RAID0 | 0102 | 40GB | iSCSI GW | NUM003002 |
|  |  |  |  |  |  |  |
|  |  |  |  |  |  |  |

FIG.22

| LU NUMBER (LUN) 1101 | VENDOR IDENTIFIER 1102 | PRODUCT IDENTIFIER 1103 | PRODUCT REVISION NUMBER 1104 | CAPACITY [BYTE] 1105 | DEVICE IDENTIFIER 1106 | UNIT SERIAL NUMBER 1107 |
|---|---|---|---|---|---|---|
| 0 | AAA | RAID5 | 0201 | 20GB | iSCSI RAID | SN01001 |
| 1 | AAA | RAID5 | 0201 | 20GB | iSCSI RAID | SN01002 |
| 2 | AAA | RAID5 | 0201 | 20GB | iSCSI RAID | - |
| 5 | BBB | RAID0 | 0102 | 40GB | - | PSN02001 |
| 6 | BBB | RAID0 | 0102 | 40GB | iSCSI GW | NUM003002 |
| | | | | | | |
| | | | | | | |

STORAGE SYSTEM AND LOGICAL UNIT CHECKING METHOD FOR THE SAME

CROSS-REFERENCES TO RELATED APPLICATIONS

This application relates to and claims priority from Japanese Patent Application No. 2006-219822, filed on Aug. 11, 2006, the entire disclosure of which is incorporated herein by reference.

BACKGROUND

1. Field of the Invention

This invention relates generally to a method, adopted in the situation where communication between a storage system having a plurality of I/O ports that can be connected to a network and a host computer connected to the storage system via the network, or communication between storage systems, is carried out using iSCSI protocol, for shortening the time for the host computer to check a plurality of logical units in the storage system or for a storage system to check a plurality of logical units in another storage system.

2. Description of Related Art iSCSI (internet SCSI) is a protocol used for carrying out SCSI (Small Computer System Interface) communications on a TCP/IP (Transmission Control Protocol/Internet Protocol) network.

With iSCSI, commands and data are transmitted in units of iSCSI PDUs (Protocol Data Units). A PDU—a unit of data handled by a communication protocol—is a packet in TCP/IP or a frame in Ethernet (registered trademark). With ISCSI, a read command is called a Read Command PDU and the data sent in response to the read command is called a Data-In PDU. Incidentally, an iSCSI PDU is transmitted in the form of being packed in a TCP/IP packet in the network. In other words, Read Command PDUs and Data-In PDUs are transmitted substantially as TCP/IP packets.

With ISCSI, an initiator issues, in addition to read commands and write commands, an Inquiry PDU—a command to check logical unit(s) (LUs) in a target—and the target sends back a Data-In PDU as a reply. In iSCSI communication, if an initiator issues a check-requesting SCSI command after it receives a response for a previously issued check-requesting SCSI command, the check results, i.e., Data-In PDUs, from the targets are often sent together in one TCP/IP packet.

For the purpose of reducing network loads, TCP use the delayed acknowledgement ('delayed ACK') for delaying an acknowledgement for a received packet. With this delayed ACK, an acknowledgment is delayed by 0.5 seconds or less or until two packets are received (Non-patent document RFC1122, paragraph 4.2.5). As mentioned above, because the check results—Data-In PUDs—are sent in one TCP/IP packet, a host computer sends an acknowledgment to a storage system after a maximum of 0.5 seconds based on the delayed ACK. Because there is no communication established between the host computer and the storage system during that 0.5 seconds, the host computer issues Inquiry commands to the storage system having many LUs based on the delayed ACK, which causes a problem that the command response time as well as the check time increase.

For example, as shown in FIG. 2, in the situation where an initiator is a host computer 106 and a target is a storage system 101 or the initiator is the storage system 101 and the target is another storage system 101, when the initiator intends to check the LUs in the target, it repeats processing composed of the steps of: issuing a check command 202a—an SCSI Inquiry LUN#a—to the target; when receiving a check result 203a—an SCSI Data-In—from the target as a response to the check command, sending an acknowledgement (ACK) 205a to the target after a maximum of 0.5 second, which corresponds to waiting for two segments, based on the delayed ACK; and, when receiving an SCSI Inquiry Response 206a from the target as a response to the delayed ACK, sending an acknowledgement (ACK) 207a to the target after a maximum of 0.5 seconds, which corresponds to waiting for two segments, based on the delayed ACK. Consequently, the command reply time increases; in other words, the check time increases due to the delayed ACK.

This problem may be solved by disabling the delayed ACK; however, as delayed ACK is employed in many kinds of equipment and operating systems, disabling the delayed ACK function may badly influence the applications that run on that equipment and those operating systems. One method for avoiding the influence of delayed ACK has been suggested in the Japanese Patent Laid-Open Application Publication No. 2005-174097.

This publication describes that, after required commands are sent to peripheral devices that have delayed ACK, an 'any command' is sent to the peripheral device to avoid the effect of the delayed ACK. To be precise, the number of commands sent to the peripheral devices is counted and when the number reaches a predetermined number, an 'any command' is sent.

However, there are cases where, depending on the connection environment between the peripheral devices, the 'any command' reaches the peripheral devices after an acknowledgement delayed due to the delayed ACK does. In these cases, there is a problem in that the effect of the delayed ACK is fully active. This problem often occurs because TCP/IP is based on best-effort communication. Moreover, that 'any command' ends up in continuously running around on the connection line as unnecessary data. In other words, when an initiator checks a plurality of LUs in a storage system by means of iSCSI communication, the check time increases due to the delayed ACK employed in the TCP in the initiator.

This invention aims to prevent the increase in check time caused by the delayed ACK employed in an initiator's TCP when the initiator checks LUs in a target.

SUMMARY

In order to solve the foregoing problems, this invention provides, as one of the embodiments of this invention, a host computer and storage system having the following structures. The host computer is connected via an IP network to the storage system having a storage unit for storing data, and communicates with the storage system using iSCSI protocol. In this host computer, a communication controller for carrying out the processing for the storage system—a target—based on a logical unit check program to check logical units in the storage system can be composed of: a port controller having an interface for the storage system; a data transmission controller for controlling data transmission between the storage system and host computer; a processor for controlling the port controller and data transmission controller; and memory for storing programs and tables for the processor.

The storage system is connected to the host computer via the IP network and has a storage unit for storing data. In this storage system, a communication controller for communicating with another storage system connected to the IP network using ISCSI protocol and carrying out the processing for the other storage system—a target—based on a logical unit check program to check the logical units in the other storage system, may be composed of: an interface controller having one or more interfaces for the host computer or the other storage system; one or more disk interface controllers having interfaces for disks; memory having an area for temporarily storing data transmitted/received to/from the host computer or data to be stored in the disks as well as an area for storing control information in the storage system; and disks for storing data. The interface controller and disk interface controller are connected directly or via the memory, and the interface controller is composed of: a data transmission controller for controlling data transmission between the host computer and storage system or between the self-storage system with another storage system; processor for controlling the interface; and memory for storing programs the processor executes and tables.

Each of the host computer and storage system communication controllers may function as an initiator that obtains information for a check-target logical unit from a target; simultaneously issues, when it is judged, based on the obtained information, that the number of delayed ACKs is set to more than one, the same number of check commands as the number of delayed ACKs or check commands in multiples of the number of delayed ACKs to the target; and, when receiving check results in response to the check commands from the target, sends an acknowledgement to the target.

Because the host computer or storage system serves as an initiator that obtains, when checking the logical unit in a target, the information for the check-target logical unit from the target; simultaneously issues, when it is judged, based on the obtained information, that the number of delayed ACKs is set to more than one, the same number of check commands as the number of delayed ACKs or check commands in multiples of the number of delayed ACKs to the target; and, when receiving check results in response to the check commands from the target, sends an acknowledgement to the target, the acknowledgement is sent to the target instantly and so it is possible to prevent an increase in check time due to the delayed ACK employed in the TCP in the initiator.

The communication controller may be structured so that, if it judges based on the information obtained from the target that the number of delayed ACKs is set to two or more and that same items are checked in each LU, it simultaneously issues check commands to the target, designating the same number of LUs as the number of delayed ACKs or LUs in multiples of the number of delayed ACKs; and, sends an acknowledgement to the target when receiving the check results for all the check items for each LU. The communication controller may also be structured so that, if it judges, based on the information obtained from the target, that the number of ACKs is set to two or more and that the same items are checked in each LU, it simultaneously issues, for each check item, check commands to the target, designating the same number of LUs as the number of ACKs or LUs in multiples of the number of delayed ACKs; and, sends an acknowledgement to the target when receiving the check results for all the LUs for each check item.

The communication controller may also be structured so that, if it judges, based on the information obtained from the target that the number of ACKs is set to two or more and that different items are checked in each LU, it simultaneously issues, for each check item, check commands to the target, designating the same number of LUs as the number of ACKs, or LUs in multiples of the number of ACKs; and, sends an acknowledgement to the target when receiving the check results for all the LUs for each check item. The communication controller may also be structured so that if it judges, based on the information obtained from the target that the number of delayed ACKs is set to two or more and that different items are checked in each LU, it simultaneously issues check commands to the target, designating the same number of LUs as the number of ACKs, or LUs in multiples of the number of delayed ACKs, while combining item(s) to be checked in LU(s) with different item(s) to be checked in other LU(s), sends an acknowledgement to the target when receiving the results for all the LUs for each of the different check items.

According to this invention, when checking LUs in a target, the influence of the delayed ACK is avoided as much as possible and an increase in check time is prevented.

BRIEF DESCRIPTION OF THE DRAWINGS

FIG. 4 shows the formats of a Report LUNs Command and Report LUNs Response.

FIG. 8 shows the formats of a Read capacity Command and Read Capacity Response.

FIG. 14 shows an image of the order the LU check program according to Embodiment 1 checks the items in the LU check table in.

FIG. 16 shows an image of the order the LU check program according to Embodiment 2 checks the items in the LU check table in.

FIG. 20 shows an image of the order the LU check program according to Embodiment 3 checks the items in the LU check table.

FIG. 22 shows the image of the order the LU check program according to Embodiment 4 checks the items in the LU check table in.

DETAILED DESCRIPTION OF PREFERRED EMBODIMENTS

Embodiments of this invention are explained below with reference to the attached drawings.

Embodiment 1

Figure 1:
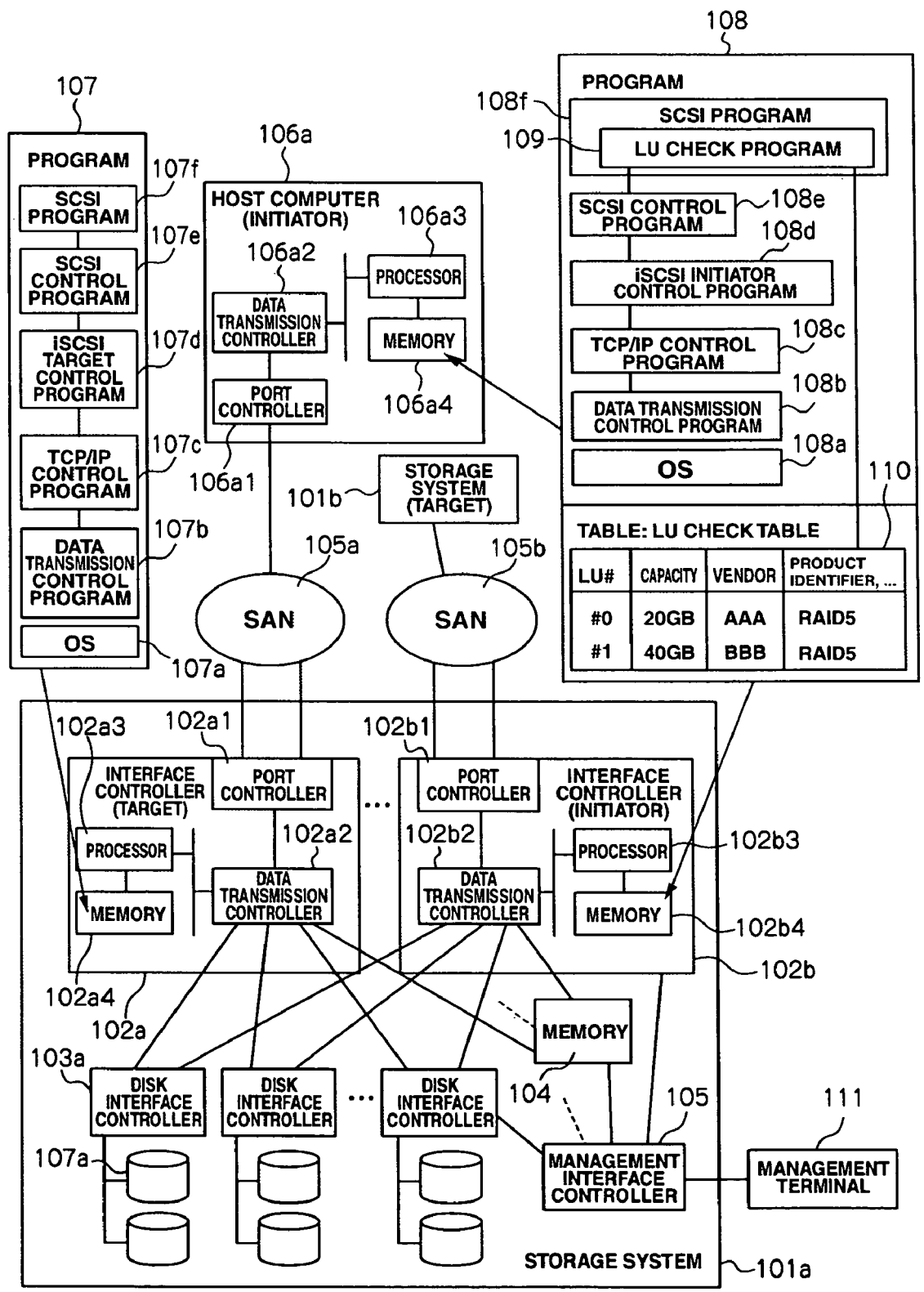
FIG. 1 shows the structure of a storage system according to Embodiment 1 of this invention.
Figure 2:
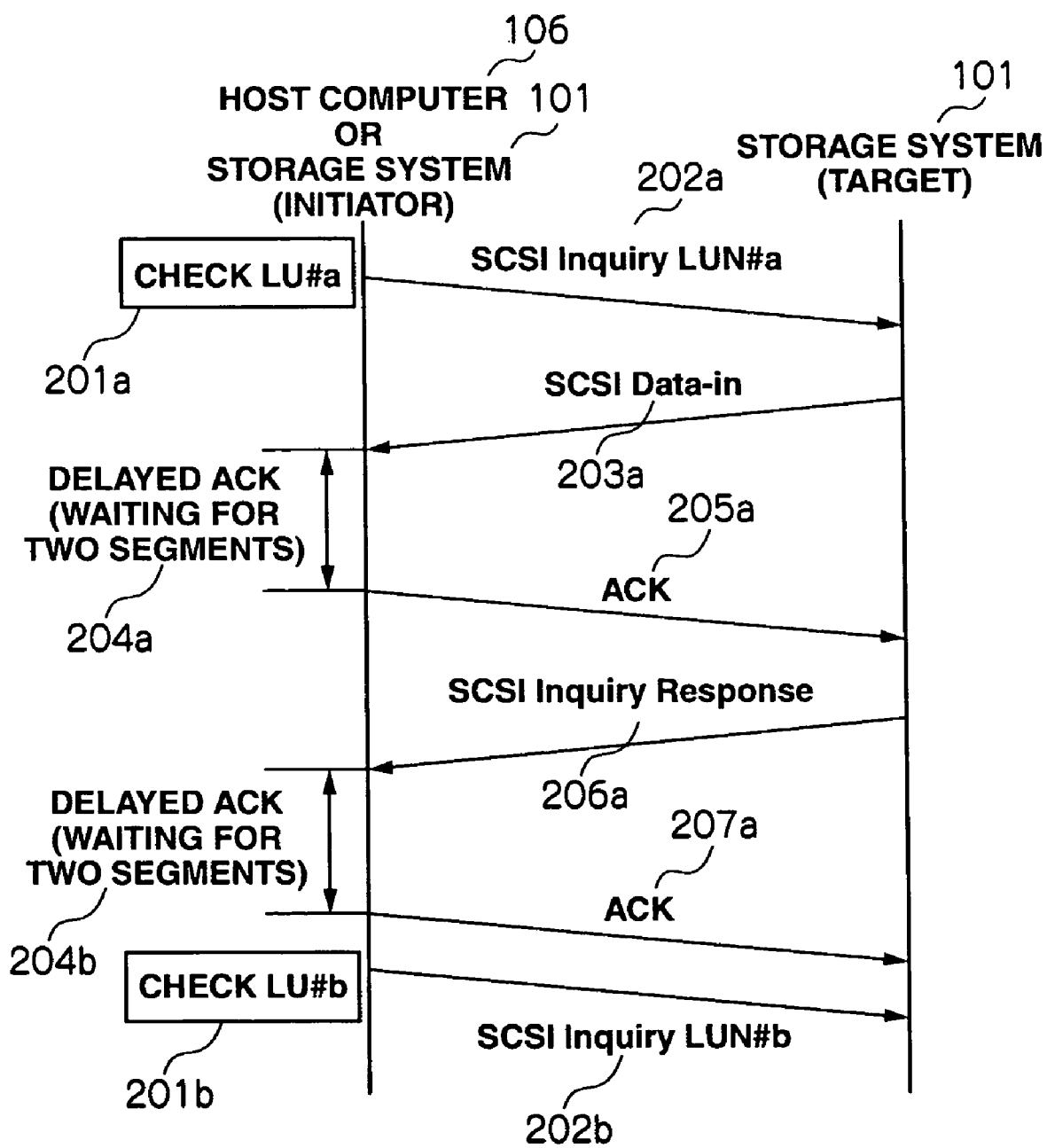
FIG. 2 shows an example of issued commands and responses according to a prior art.

Embodiment 1 of this invention is explained below. FIG. 1 shows an example of the structure of a storage system. A storage system 101a is connected to a host computer 106a via a SAN (Storage Area Network) 105a and also to another storage system 101b via another SAN 105b. Normally, the SANs 105 are networks composed of switches (not shown in the drawing) and the connections are realized by Fibre Channel or Ethernet (registered trademark).

The storage system 101a is composed of an interface controllers (102a, 102b, . . . ), disk interface controllers (103a, 103b, . . . ), memory 104, management interface controller 105, and management terminal 111. The storage system 101b is structured the same way as the storage system 101a, so specific explanations have been omitted.

The interface controller 102a, serving as a communication controller, has an interface for the host computer 106 and is composed of a port controller 102a1, data transmission processor 102a2, processor 102a3, and memory 102a4. Each disk interface controller 103 has the same internal structure (not shown in the drawing) as the interface controller 102a, and is connected to a plurality of disks (107a, 107b, . . . ) storing data sent/received to/from the host computer 106a.

The memory 104 has: a cache memory area (not shown in the drawing) for temporarily storing data sent/received to/from the host computer 106a; and a shared memory area (not shown in the drawing) for storing control information and configuration information in the storage system 101a. The management interface controller 105 has the same internal structure (not shown in the drawing) as the interface controller 102a and is connected to a management terminal 111.

The management terminal 111 has the same internal structure (not shown in the drawing) as the host computer 106a, executes programs for managing the storage system 101a, and stores the control information and configuration information in the memory 104. The memory 102a4 in the interface controller 102a stores, as a program 107 for a target, an operating system (OS) 107a, data transmission and reception control program 107B, TCP/IP control program 107c, iSCSI target control program 107d, SCSI control program 107e, and SCSI application 107f.

The interface controller 102a serves as a target for the host computer 106a. The host computer 106a has an interface for the storage system 101a and its communication controller is composed of a port controller 106a1, data transmission controller 106a2, processor 106a3 and memory 106a4.

The memory 106a4 in the host computer 106a or the memory 102b4 in the interface controller 102b in the storage system 101a, stores, as a program 108 for an initiator, an operating system (OS) 108a, data transmission and reception control program 108b, TCP/IP control program 108c, iSCSI initiator control program 108d, SCSI control program 108e, and SCSI application 108f. It also stores an LU check program 109 as an example of the SCSI application 108f, and an LU check table 110 used by the LU check program 109. The host computer 106a serves as an initiator for the storage system 101a (target), and the interface controller 102b in the storage system 101a serves as an initiator for the storage system 101b (target).

Figure 3:
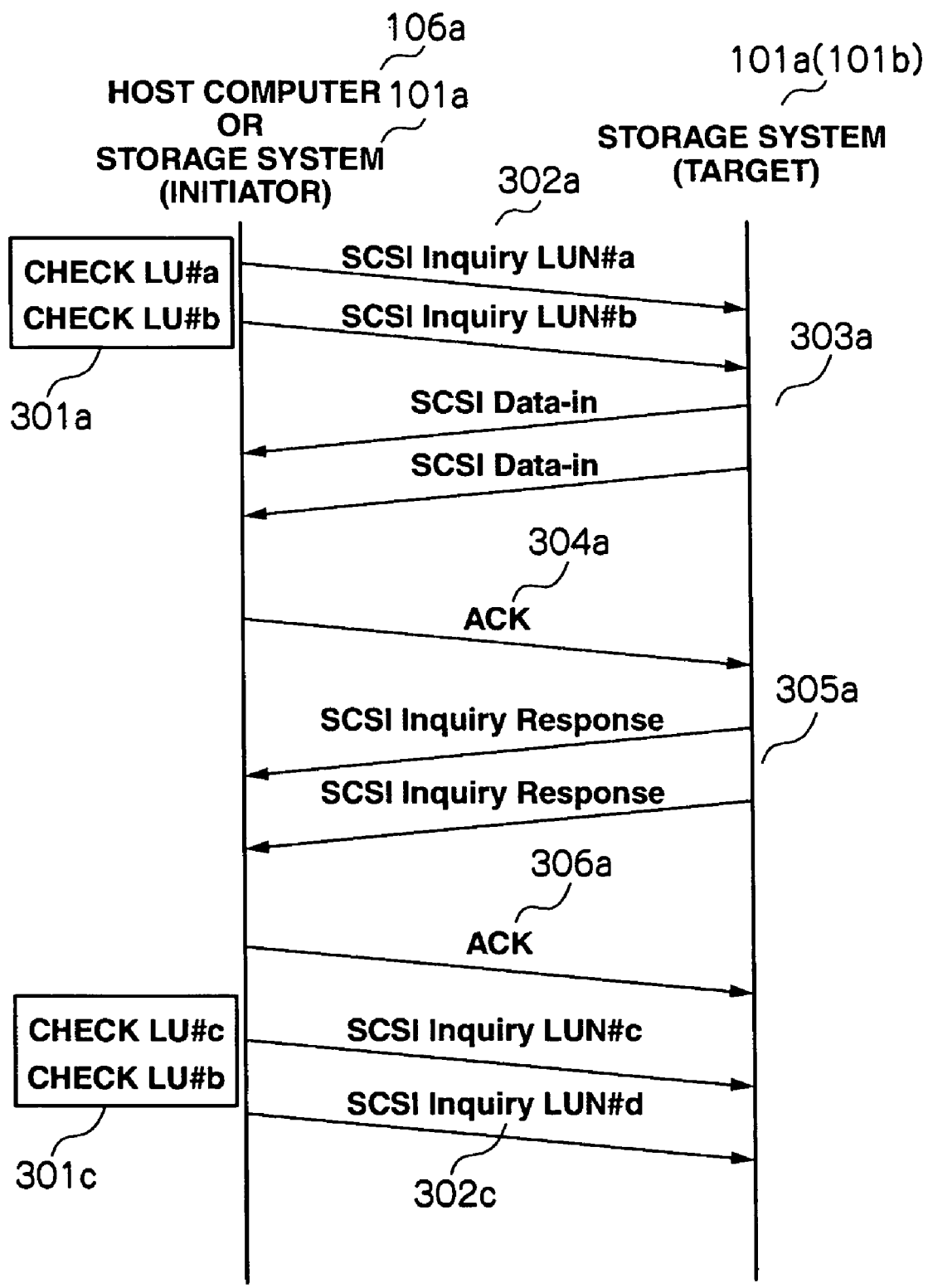
FIG. 3 shows an example of issued commands and responses according to this invention.

FIG. 3 shows the relationships between issued commands and responses in the situation where the host computer 106a or storage system 101a is an initiator and the storage system 101a or storage system 101b is a target and the initiator checks the LUs in the target.

FIG. 4 shows the message format of a Report LUNs Command 401 an initiator issues to check the LUNs (logical unit numbers) of LUs in the storage systems 101a and 101b based on the LU check program 109; and the message format of a Report LUNs Response 402, which is a response to that command. These formats and the SCSI commands described below are the formats defined by American National Standard Institute and they are used as they are in this specification.

Figure 5:
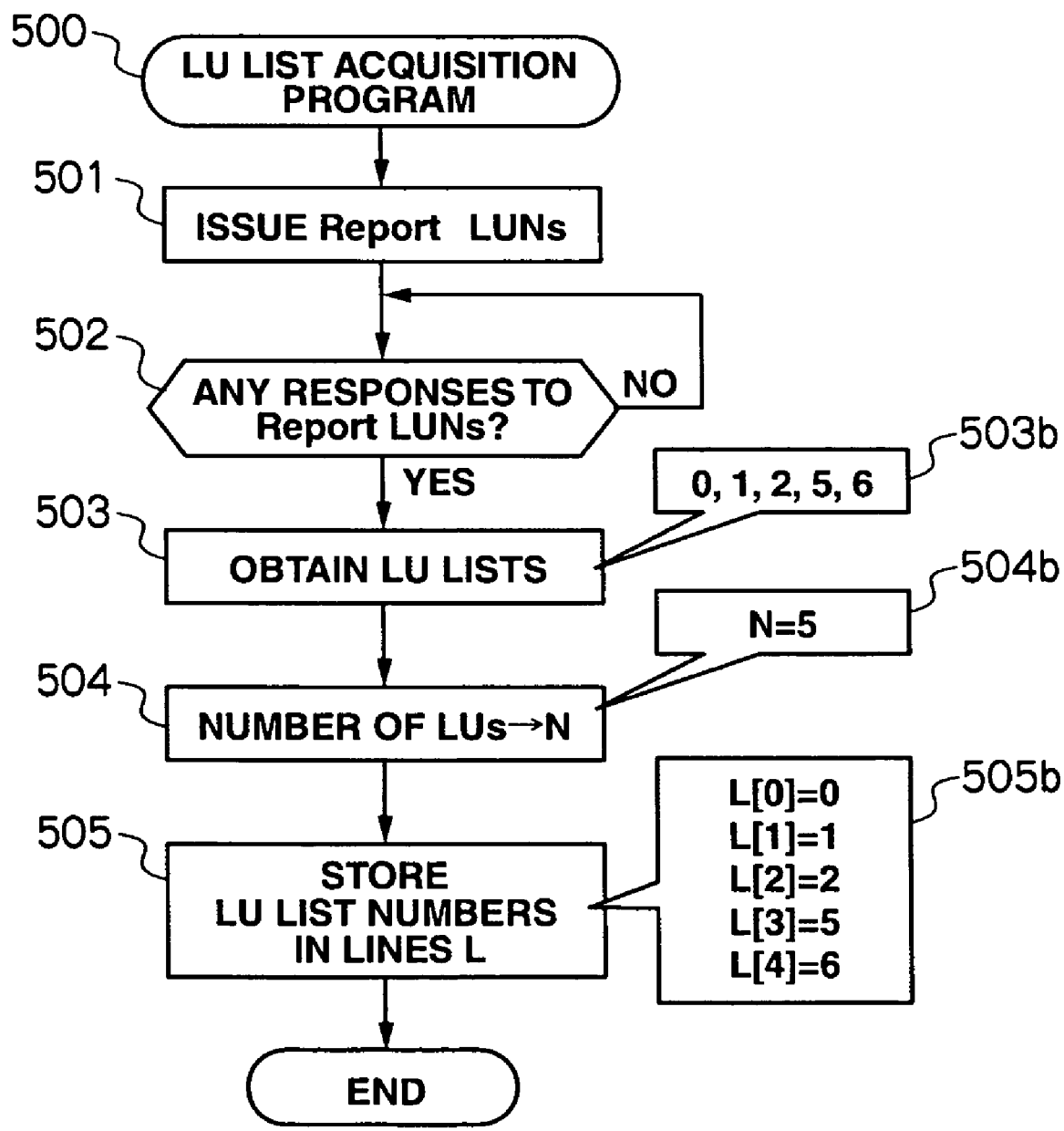
FIG. 5 is a flowchart of processing based on an LU list acquisition program.

FIG. 5 is a flowchart of the processing based on the acquisition program 500 performed for an initiator to obtain the LU lists in the target using the LU check program 109. First, the initiator issues a Report LUNs command 401 (step 501) and waits for a response, i.e., a Report LUNs Response 402 (step 502). If there is no response, the error processing is performed. When there is a response in step 502, the initiator obtains the LU lists contained in the Report LUNs Response 402 (step 503), substitutes the number of LUs for a variable N (step 504), and stores the LU list numbers in the lines L respectively (step 505). The balloon 503b attached to step 503 shows an example where there are five LU lists (0, 1, 2, 5, and 6), the balloon 504b attached to step 504 shows an example where the number of LUs is five, and the balloon 505b attached to step 505 shows an example of the lines L. Balloons are also used in the following explanations, showing examples of the values of variables etc. at particular points in time.

Figure 6:
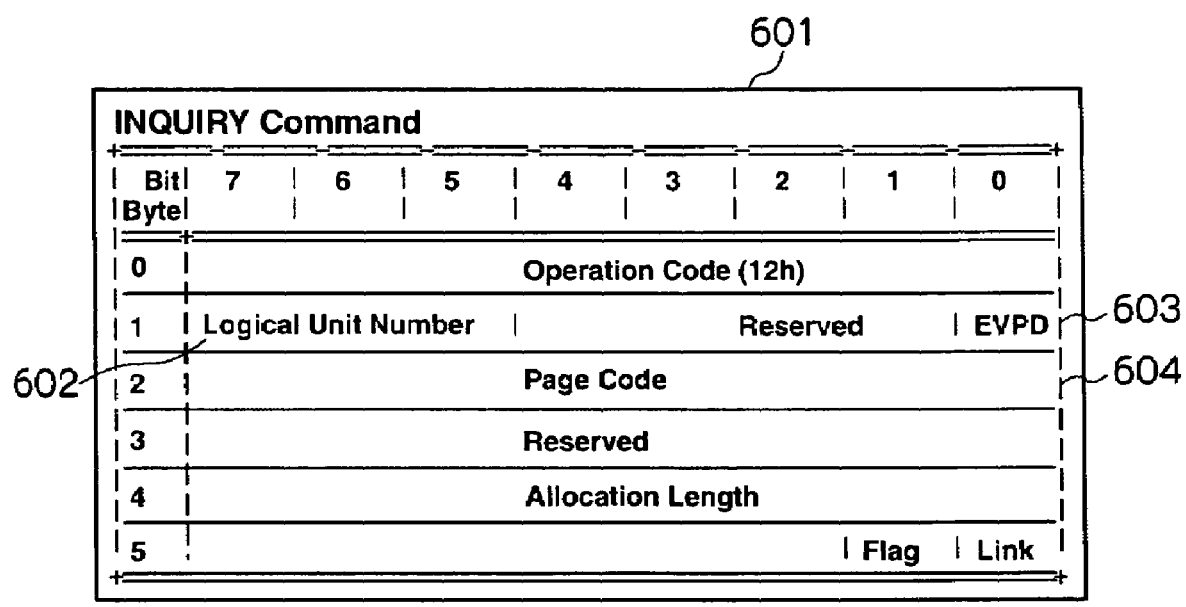
FIG. 6 shows the format of an Inquiry Command.
Figure 7:
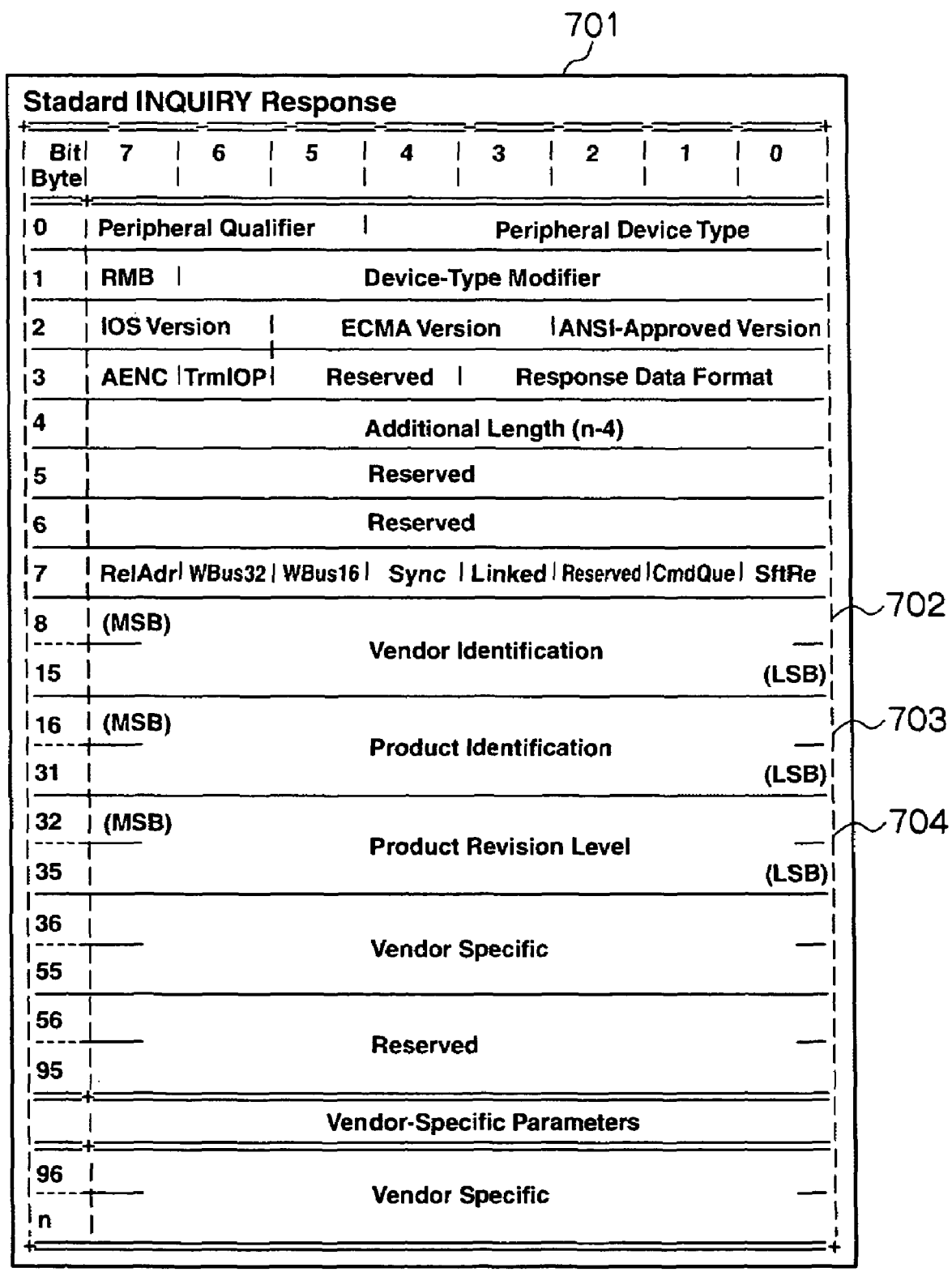
FIG. 7 shows the format of a response to an Inquiry Command.

FIGS. 6 and 7 show the message format of an Inquiry Command 601 the initiator issues to check a designated LU based on the LU check program 109; and the message format of a Standard Inquiry Response 701, which is a response to the command. Because the Inquiry command 601 has to designate an LU identifier, i.e., an LUN, it includes an LUN field. When 0 is entered in the EVPD (Enable Virtual Product Data) field 603, a Standard Inquiry Response 701 including the information corresponding to that value 0 is made. When 1 is entered in the EVPD field 603 and a value is entered in the Page Code field 604, a Standard Inquiry Response 701 including the information corresponding to those values is made.

The standard Inquiry Response 701 includes a vendor identification field 702, product identification field 703, and product revision number field 704 where values are stored. When the initiator enters 1 in the EVPD field 603 in an Inquiry command 601 and 0x83 in the Page Code field 604, the target stores a device identifier in a response. When the initiator enters 0x 80 in the Page Code field 604, the target stores a unit serial No. in the response. Explanations for the response format will be omitted.

FIG. 8 shows the message format of a Read Capacity Command 801 an initiator issues to check the capacity of a designated LU command based on the LU check program 109; and the message format of a Read Capacity Response 802, which is a response to that command. Because the Read Capacity Command 801 has to designate an LU identifier, i.e., an LUN, it includes an LUN field 802.

Figure 9:
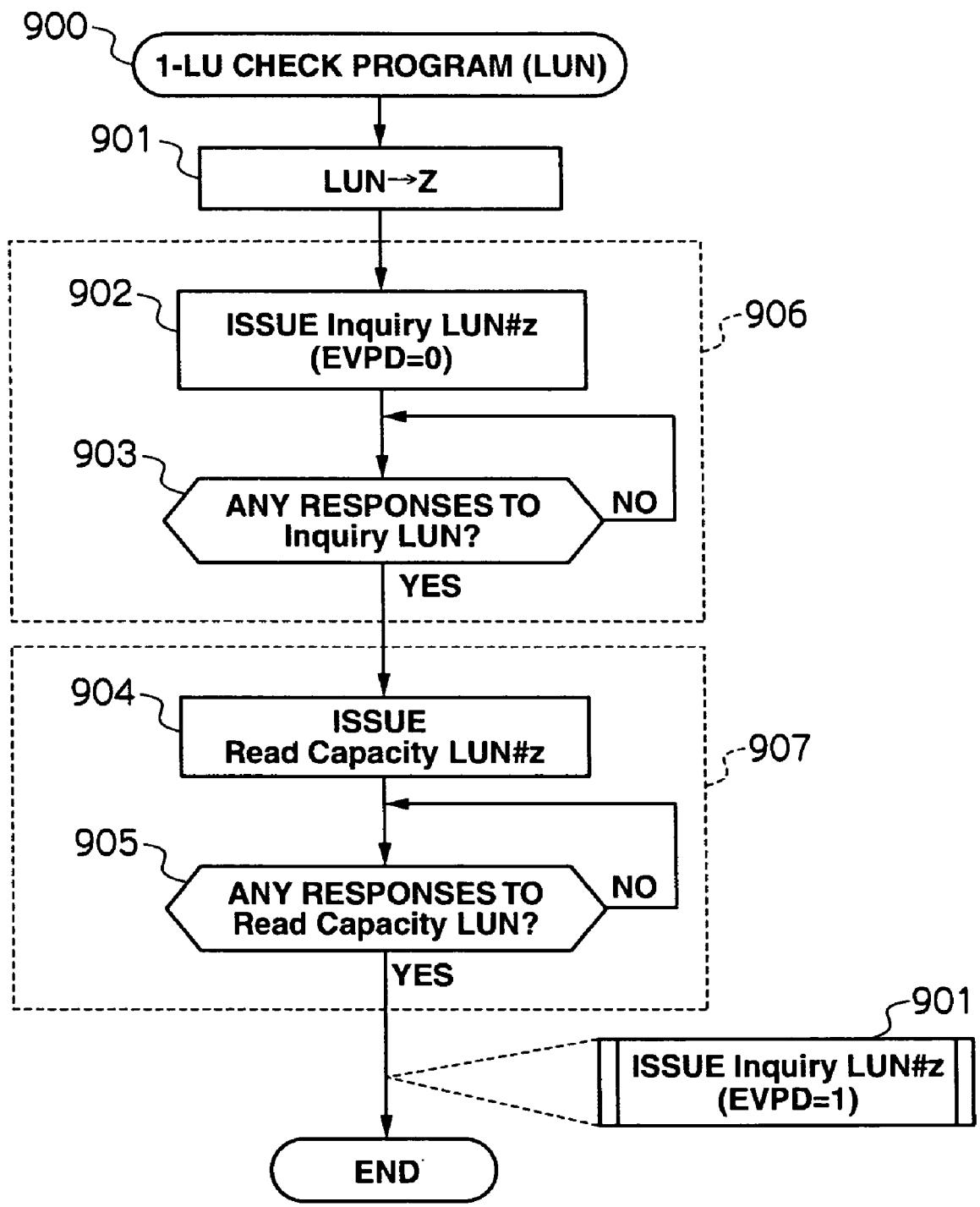
FIG. 9 is a flowchart of the processing to check a designated LU's vendor identifier, product identifier, product revision number, and capacity.

FIG. 9 is a flowchart of the processing where an initiator checks a designated LU's vendor identifier, product identifier, product revision number, and capacity, based on the LU check program 109. First, the initiator substitutes the designated LUN for a variable z (step 901), enters z in the LUN field 602, issues an Inquiry Command where 0 is entered in the EVPD field 603 (step 902), and waits for a Standard Inquiry Response (step 903).

Then, the initiator issues a Read Capacity Command where z is entered in the LUN field 802 (step 904) and waits for a Read Capacity Response (step 905). Incidentally, some steps in FIG. 9 are surrounded by dotted lines and marked as steps 906 and 907 so as to be used in the explanations below. The processing starting with step 910 for issuing an Inquiry Command where 1 is entered in the EVPD field is executed in step 905 and its details are shown in FIG. 10.

Figure 10:
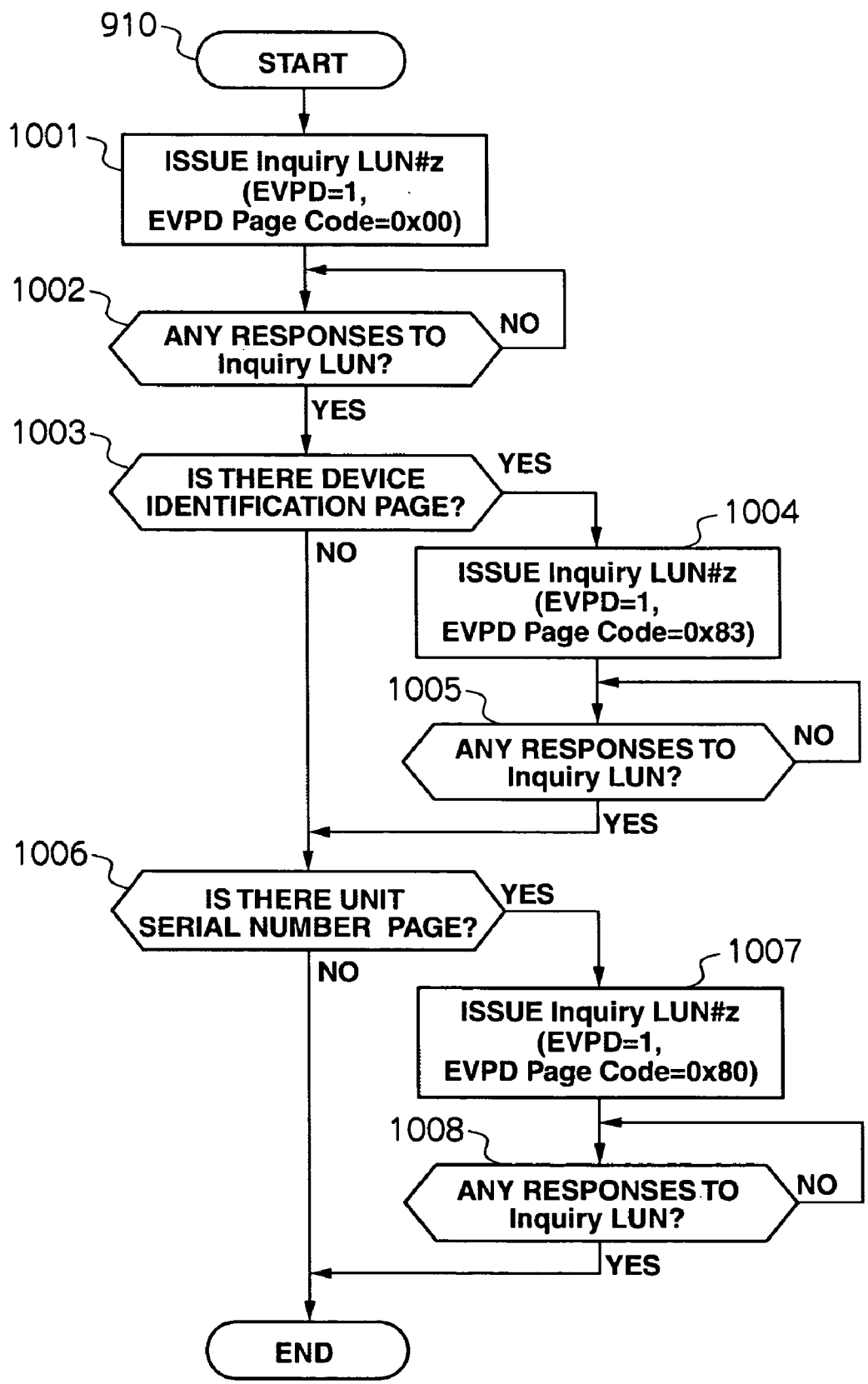
FIG. 10 is a flowchart of the processing to check a designated LU's device identifier and unit serial number.

FIG. 10 is a flowchart of the processing where an initiator checks a designated LU's device identifier and unit serial number based on the LU check program 109. The initiator issues an Inquiry Command where 1 is entered in the EVPD field 603 and 0x00 is entered in the page Code field 604 (step 1001), and waits for a response (step 1002). The response made in step 1002 includes the Page Code list of the designated LUN. The initiator judges whether the Page Code list has a device identification page, i.e., whether 0x83 is on the list (step 1003) and, if the judgment is positive, issues an Inquiry Command where 1 is entered in the EVPD field 603 and 0x83 is entered in the Page Code field 604 (step 1004), and waits for a response (step 1005). The initiator then judges whether the Page Code list includes a unit serial number page, i.e., whether 0x80 is on the list (step 1006) and, if the judgment is positive, it issues an Inquiry Command where 1 is entered in the EVPD field 603 and 0x80 is entered in the Page Code field 604 (step 1007), and waits for a response (step 1008).

Figure 11:
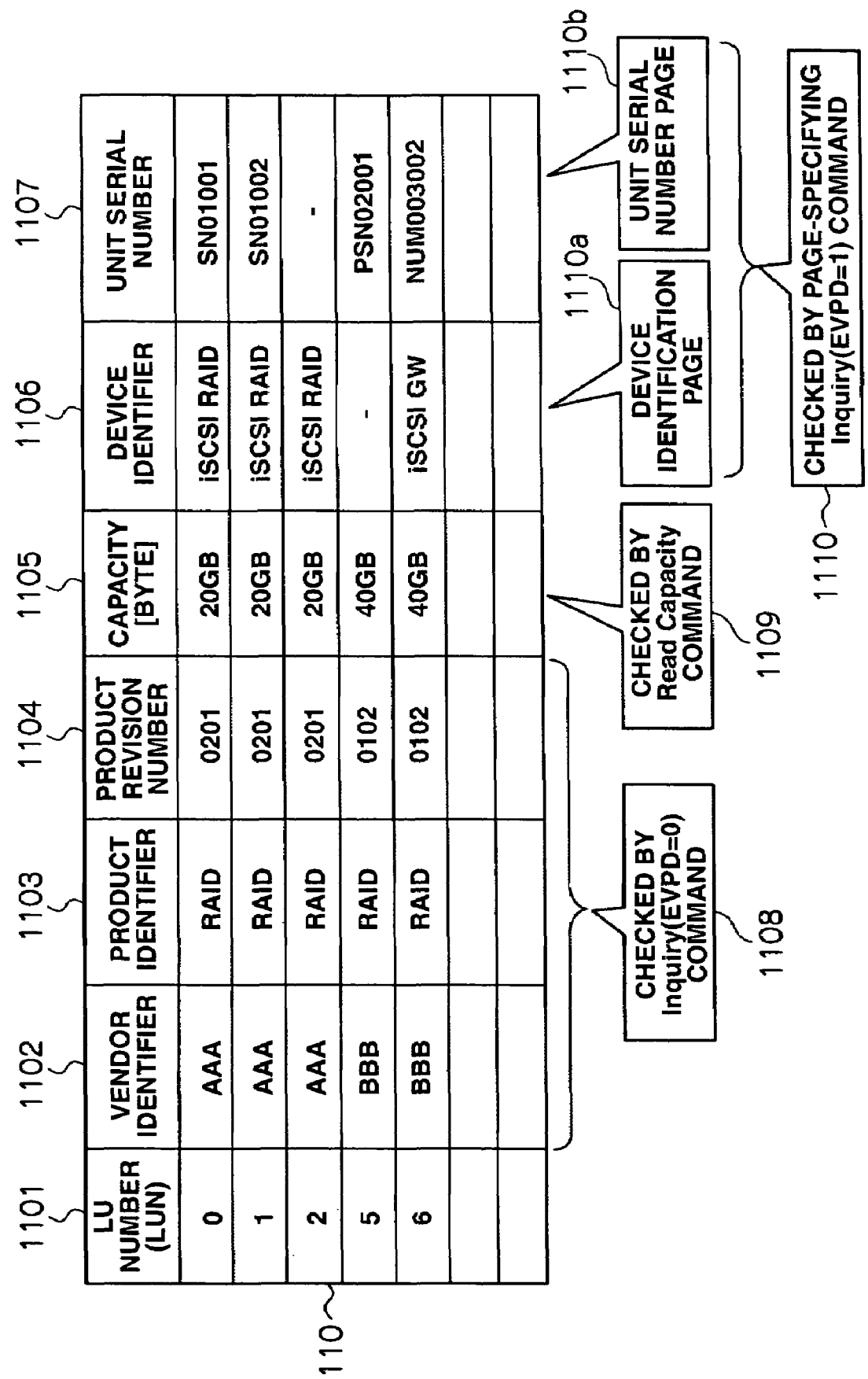
FIG. 11 shows an example of an LU check table.

FIG. 11 shows an example of the LU check table storing the results of a check performed based on the LU check program 109. The LU check table 110 stores LUNs 1101, vendor identifiers 1102, product identifiers 1103, product revision numbers 1104, capacities 1105, device identifiers 1106, and unit serial numbers 1107. An LU number 1101 is obtained in step 503 in FIG. 5. A vendor identifier 1102, product identifier 1103 and product revision number 1104 are obtained in step 906 in FIG. 9. A capacity 1105 is obtained in step 907 in FIG. 9. A device identifier 1106 is obtained in steps 1004 and 1005 in FIG. 10. A unit serial number 1107 is obtained in steps 1007 and 1008 in FIG. 10. Although this LU check table 110 is kept in the LU check program 109, it may also be displayed on the screen of the host computer 106a or management terminal 111 in the form shown in FIG. 11, and in addition to the values in the table, the operational status of the LU check program 109, i.e., 'yet to check,' 'check in progress,' 'check successful,' or 'check failed' may also be shown together (not shown in the drawing).

Figure 12:
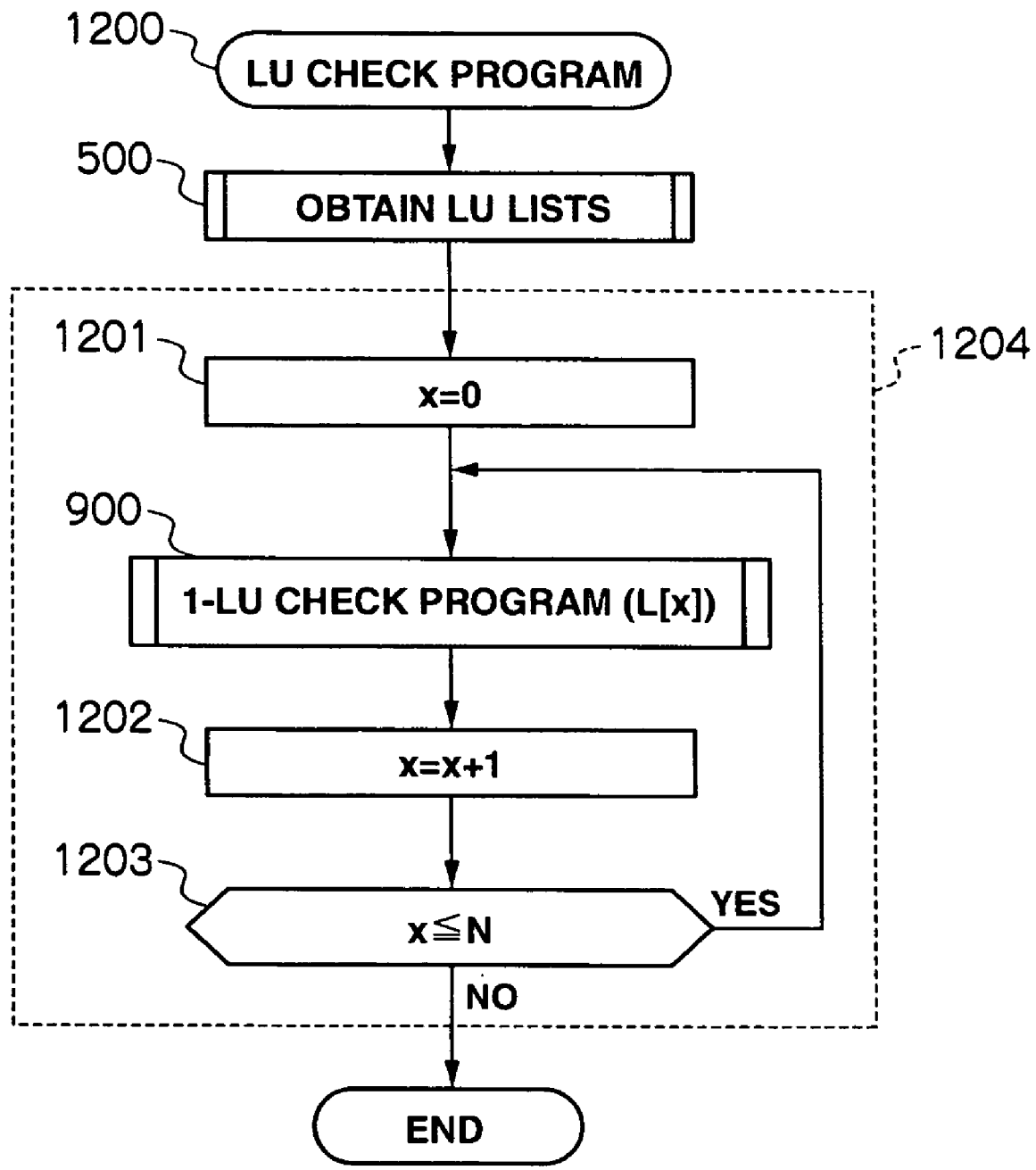
FIG. 12 is a flowchart of processing based on an LU check program.

FIG. 12 is a flowchart of processing where an initiator checks LUs in the same way as in conventional techniques, based on the LU check program 109. First, the initiator obtains the LU lists as described in FIG. 5 and stores the LU list numbers in the lines L (step 500). The initiator then substitutes 0 for a temporary variable x (step 1201), and conducts the LU check processing as shown in FIG. 9 for the LU identified by the LUN indicated by the line L[x] (step 900). The initiator then repeats the processing in FIG. 9 (step 900) while repeatedly incrementing the variable x by one until it reaches the number N of LUs (step 1202), and stores the check results in the LU check table 110 shown in FIG. 11. Incidentally, some steps in FIG. 12 are surrounded by a dotted line and marked as step 1204 so as to be able to be used in the explanations below.

Figure 13:
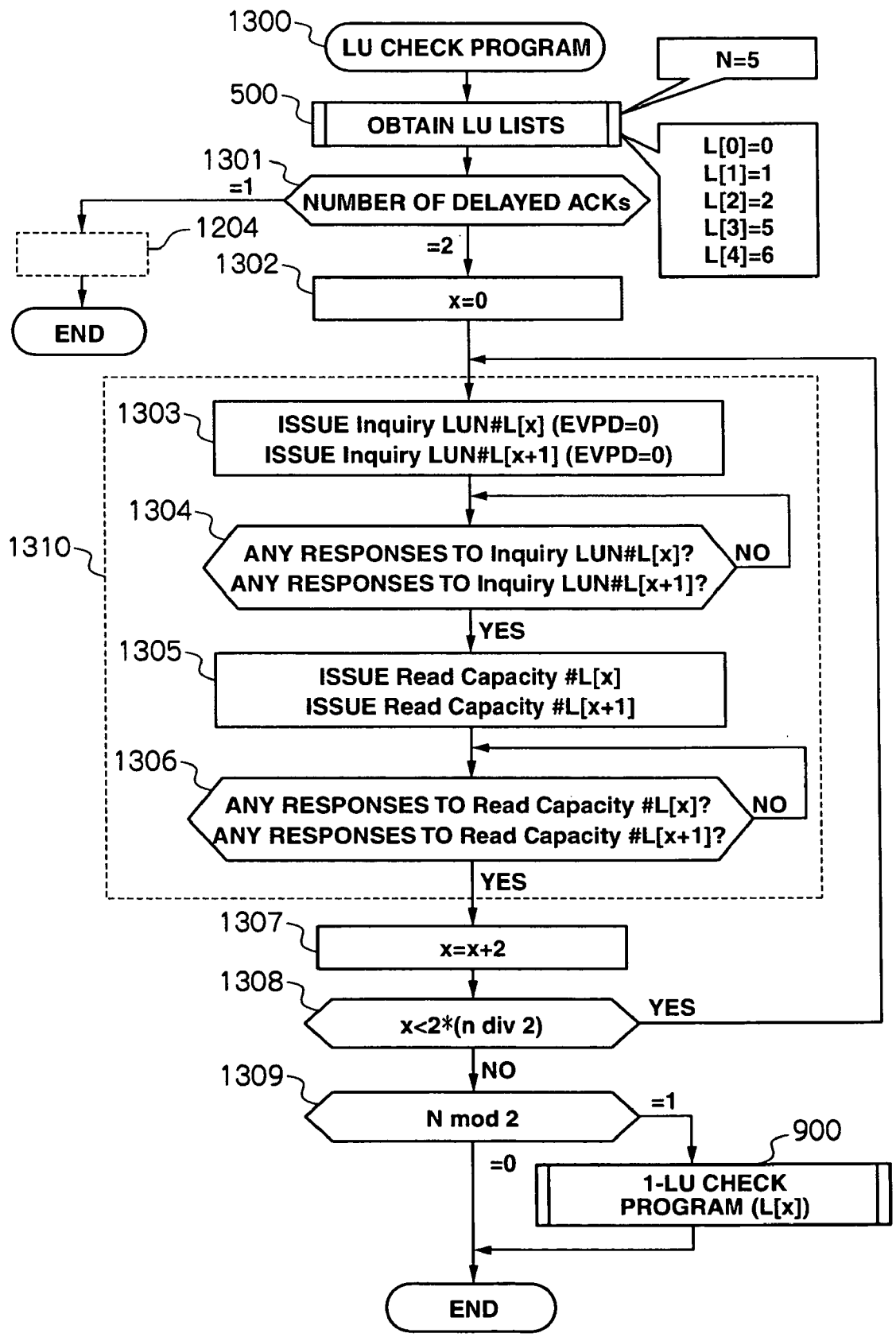
FIG. 13 is a flowchart of processing based on the LU check program according to Embodiment 1.

FIG. 13 is a flowchart of processing where an initiator checks LUs using the method according to Embodiment 1, based on the LU check program 109. First, the initiator obtains the LU lists as described in FIG. 5 and stores the LU list numbers in the lines L (step 500). Then, if the number of delayed ACKs is set to one in the TCP/IP control program 108c in the host computer 106 or in the TCP/IP control program 108c in the interface controller 102 where the LU check program 109 is executed (step 1301), the initiator carries out the processing in step 1204 in FIG. 12 in the same way as in conventional techniques. If the number of delayed ACKs is two, the initiator substitutes 0 for a temporary variable x (step 1302), issues two Inquiry Commands where 0 is entered in each EVPD field 603, designating the two LUNs indicated by the lines L[x] and L[x+1] (step 1303), and waits for two responses (step 1304).

Likewise, the initiator issues two Read Capacity Commands designating the two LUNs indicated by the lines L[x] and L[X+1] (step 1305) and waits for two responses (step 1306). As long as the variable x does not exceed the value obtained by multiplying the quotient resulting from dividing the number N of LUs by two (step 1308) by two, the initiator repeatedly increments the variable x by two (step 1307) and repeats steps 1303 to 1306. If inequality is not established in step 1308, the initiator carries out the processing shown in FIG. 9 (step 900) only if the remainder obtained from dividing the number N of LUs by two is one (step 1309). Incidentally, some steps in FIG. 13 are surrounded by a dotted line and marked as step 1310 so as to be able to be used in the explanations below. Although the number of commands issued simultaneously in step 1310 is two, which is an example where the number is the same as the number of delayed ACKs, the number of commands to be issued simultaneously may be a multiple of the number of delayed ACKs.

Alternatively, based on the processing based on the LU check program 109, the management terminal 111 may designate the number of commands to be issued simultaneously. Regarding the flow in step 1310 where the Inquiry Commands are simultaneously issued first and then Read Capacity Commands are simultaneously issued, there would be no problem if it were changed to issuing the Inquiry Commands and Read Capacity Commands all together at the same time. The processing based on the LU check program 109 according to Embodiment 1 is characterized in that, after all kinds of checks are performed for one selected LU by issuing Inquiry commands and Read Capacity commands, the next selected LU is checked in the same way.

FIG. 14 shows an image of the order the respective items stored in the LU check table 110 are checked in during the processing shown in FIG. 13. The initiator checks the four items from vendor identifiers 1102 to capacities 1105 in the order shown with the arrows 1401, 1402, 1403. The arrows 1401 and 1402 show the check processing performed in step 1310, while the arrow 1403 shows the check processing performed in step 900 in FIG. 13.

In Embodiment 1, as shown in FIG. 3, in the situation where the host computer 106a or storage system 101a is an initiator and the storage system 101a or another storage system 101b is a target, when the initiator intends to check the LUs in the target, it obtains information 301a for the check target LUs from the target, and if, as judged based on the obtained information 301a, the number of delayed ACKs is set to a number larger than one, it simultaneously issues the same number of check commands 302a, i.e., SCSI Inquiry LUN#a and SCSI Inquiry LUN#b, as the number of delayed ACKs, or check commands in multiples of the number of delayed ACKs; and when receiving from the target the check results 303a—SCSI Data-In—in response to the check commands, it sends an acknowledgment 304a to the target. Accordingly, the acknowledgement 304a is sent instantly to the target, so it is possible to prevent an increase in check time due to the delayed ACK employed in the TCP in the initiator.

According to Embodiment 1, if the initiator judges, based on the information obtained from the target, that the number of delayed ACKs is set to two or more and that the same items are checked in each LU, it simultaneously issues check commands to the target, designating the same number of LUs as the number of delayed ACKs, or LUs in multiples of the number of delayed ACKs; and, sends an acknowledgement to the target when receiving the check results for all the check items for each LU. Therefore, during checking of the LUs in the target, the influence of the delayed ACK can be avoided as much as possible and an increase in check time can be prevented.

Embodiment 2

Embodiment 2 of this invention is explained below. This embodiment is different from Embodiment 1 in that, based on the LU check program 109, an initiator carries out, at first, Inquiry Commands-using checks for all the LUs and, after that check is over, it carries out Read-Capacity-Commands using checks for all the LUs. This processing is characterized in that the initiator checks all the LUs for each check item.

Figure 15:
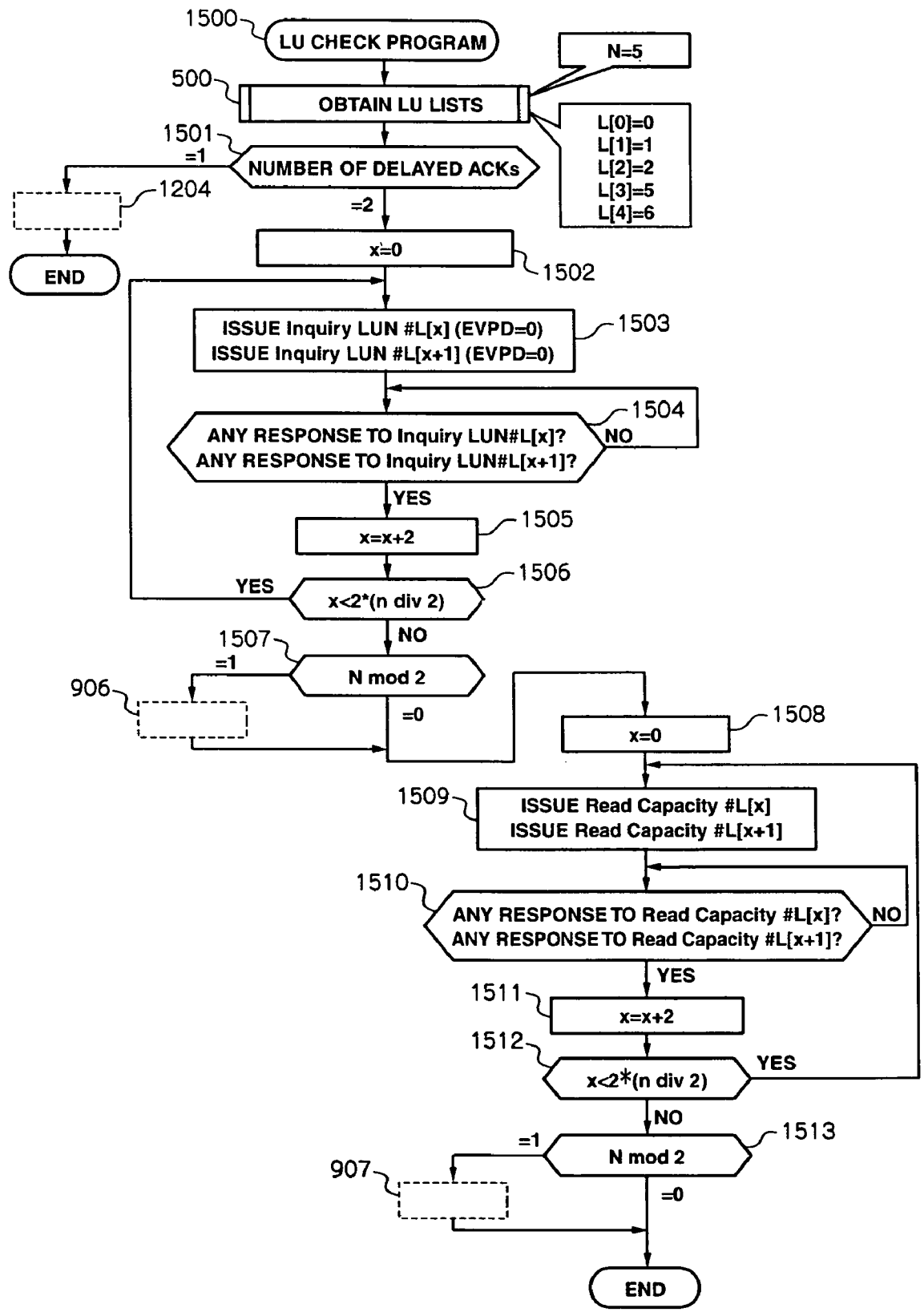
FIG. 15 is a flowchart of processing based on the LU check program according to Embodiment 2.

FIG. 15 is a flowchart of the processing where an initiator checks LUs based on the LU check program 109, according to Embodiment 2. First, the initiator obtains the LU lists as described in FIG. 5 and stores the LU list numbers in the lines L (step 500). Then, if the number of delayed ACKs is set to one in the TCP/IP control 108c in the host computer 106 or in the TCP/IP control 108c in the interface controller 102 where the LU check program 109 is executed (step 1501), the initiator carries out the processing shown in step 1204 in FIG. 12 in the same way as in conventional techniques. However, if the number of delayed ACKs is set to two, it substitutes 0 for a temporary variable x (step 1502), issues two Inquiry Commands where 0 is entered in each EVPD field 603, designating two LUNs indicated by the line L[x] and the line L[x+1] and waits for two responses (step 1504).

As long as the variable x does not exceed the value obtained by multiplying the quotient resulting from dividing the number N of LUs by two (step 1506) by two, the initiator repeatedly increments the variable x by two (step 1505) and repeats steps 1503 and 1504. If inequality is not established in step 1506, the initiator carries out the processing shown in FIG. 9 (step 906) only if the remainder obtained from dividing the number N of LUs by two is one (step 1507). Then, the initiator substitutes 0 for a temporary variable x (step 1508), issues two Read Capacity Commands, designating the two LUNs indicated by the line L[x] and the line [x+1] (step 1509), and waits for two responses (step 1510). As long as the variable x does not exceed the value obtained by multiplying the quotient resulting from dividing the number N of LUs by two (step 1512) by two, the initiator repeatedly increments the variable x by two (step 1511) and repeats steps 1509 and 1510. When the inequality is not established in step 1512, the initiator carries out the processing shown in FIG. 9 (step 907) only if the remainder obtained from dividing the number N of LUs by two is one (step 1513).

FIG. 16 shows an image of the order the initiator checks the respective items stored in the LU check table 110 in during the processing shown in FIG. 15. The arrows show the order of steps in the processing. The initiator checks the three items from vendor identifiers 1102 to product revision numbers 1104 in the order shown by the arrows 1601, 1602 and 1603 and checks capacities 1105 in the order shown by the arrows 1604, 1605 and 1606. The arrows 1601 to 1603 show the check processing performed in steps 1502 to 1507 in FIG. 15 and the arrows 1604 to 1606 show the check processing performed in steps 1508 to 1512 in FIG. 15.

According to Embodiment 2, if the initiator judges, based on the information obtained from the target, that the number of ACKs is set to two or more and that the same items are checked in each LU, it simultaneously issues, for each check item, check commands to the target, designating the same number of LUs as the number of ACKs, or LUs in multiples of the number of ACKs; and, sends an acknowledgement to the target when receiving the check results for all the LUs for each check item. Therefore, during checking of the LUs in the target, the influence of the delayed ACK can be avoided as much as possible and an increase in check time can be prevented.

Embodiment 3

Embodiment 3 of this invention is explained below. This embodiment is different from Embodiments 1 and 2 in that different items are checked in each LU; in other words, device identifiers 1106 are checked in some LUs but not in others and serial numbers are checked in some LUs but not for others.

Figure 17:
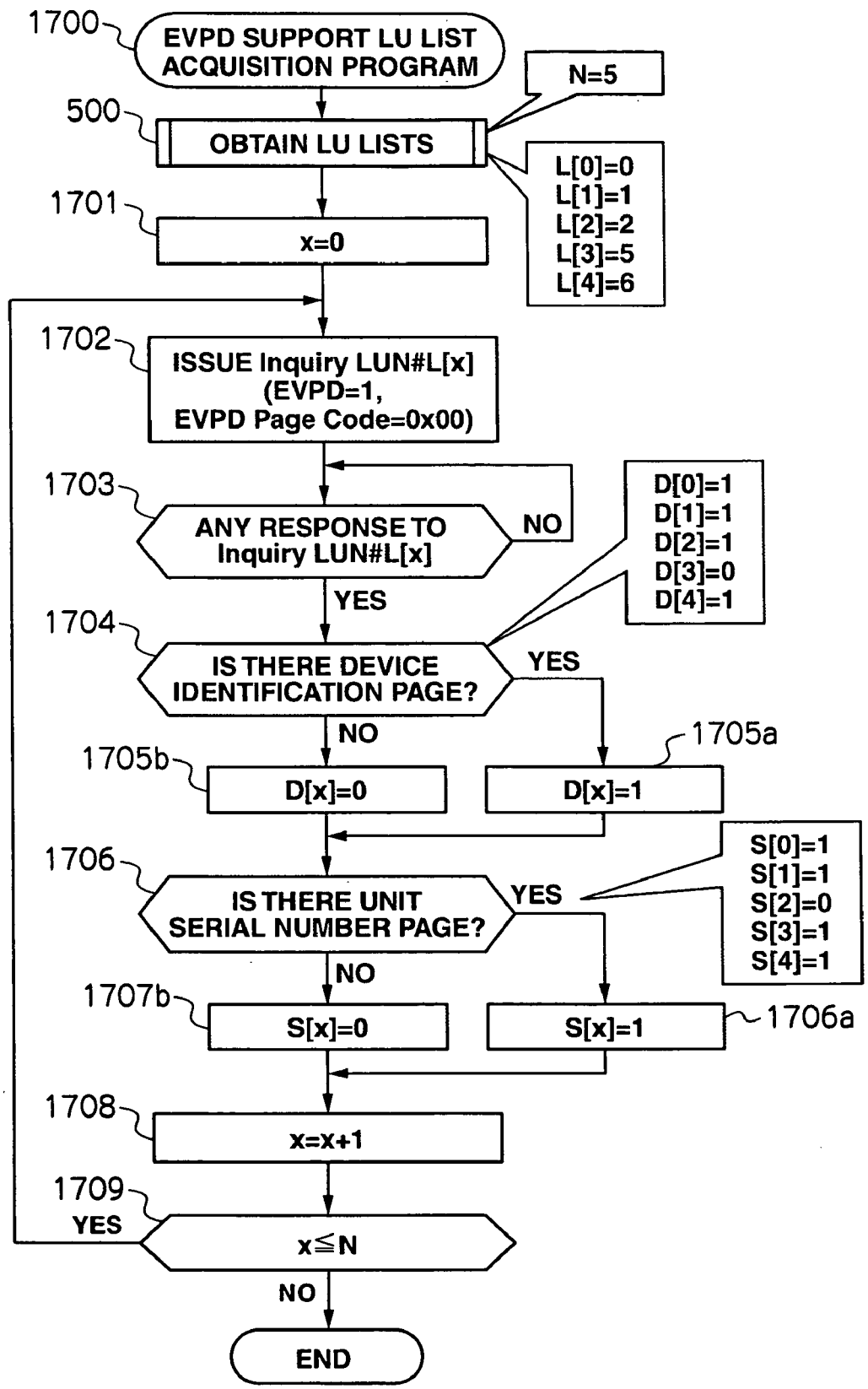
FIG. 17 is a flowchart of processing based on an EVPD-supporting LU list acquisition program.

In contrast to FIG. 10, which shows processing where a device identifier and unit serial number are checked in one LU, FIG. 17 shows the check processing where, in order to check all the LUs, whether they have device identifiers and unit serial numbers is checked and a list is made. First, the initiator obtains the LU lists as described in FIG. 5 and stores the LU list numbers in the lines L (step 500). The initiator then substitutes 0 for a temporary variable x (step 1701), issues an Inquiry Command where 1 is entered in the EVPD field and 0x00 is entered in the Page Code field 604, designating the LUN indicated by the line L[x] (step 1702), and waits for a response (step 1703). Then, it judges whether the Page Code list includes a device identification page, i.e., whether 0x83 is on the list (step 1704) and, if the judgment is positive, sets the line D[x] to 1 (step 1705a); meanwhile, if the judgment is negative, it sets the line D[x] to 0 (step 1705b).

The initiator then judges whether the Page Code list includes a unit serial number page, i.e., whether 0x80 is on the list (step 1706) and, if the judgment is positive, sets the line S[x] to 1 (step 1707a); meanwhile, if the judgment is negative, it sets the line S[x] to 0 (step 1707b). Then, the initiator repeats steps 1702 to 1707 while repeatedly incrementing the variable x by one until it reaches the number N of LUs (step 1708).

Figure 18:
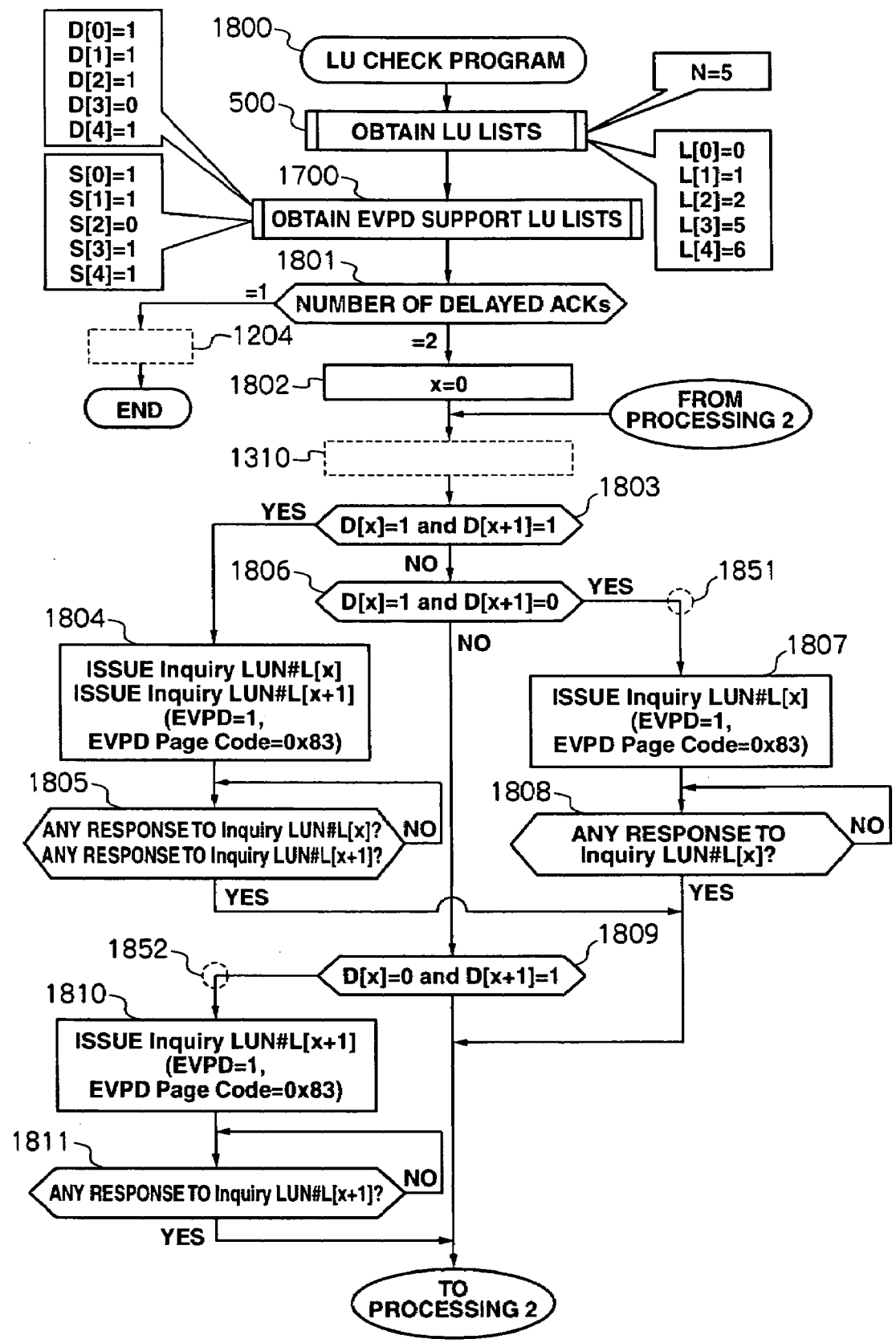
FIG. 18 is a flowchart of processing based on the LU check program according to Embodiment 3.
Figure 19:
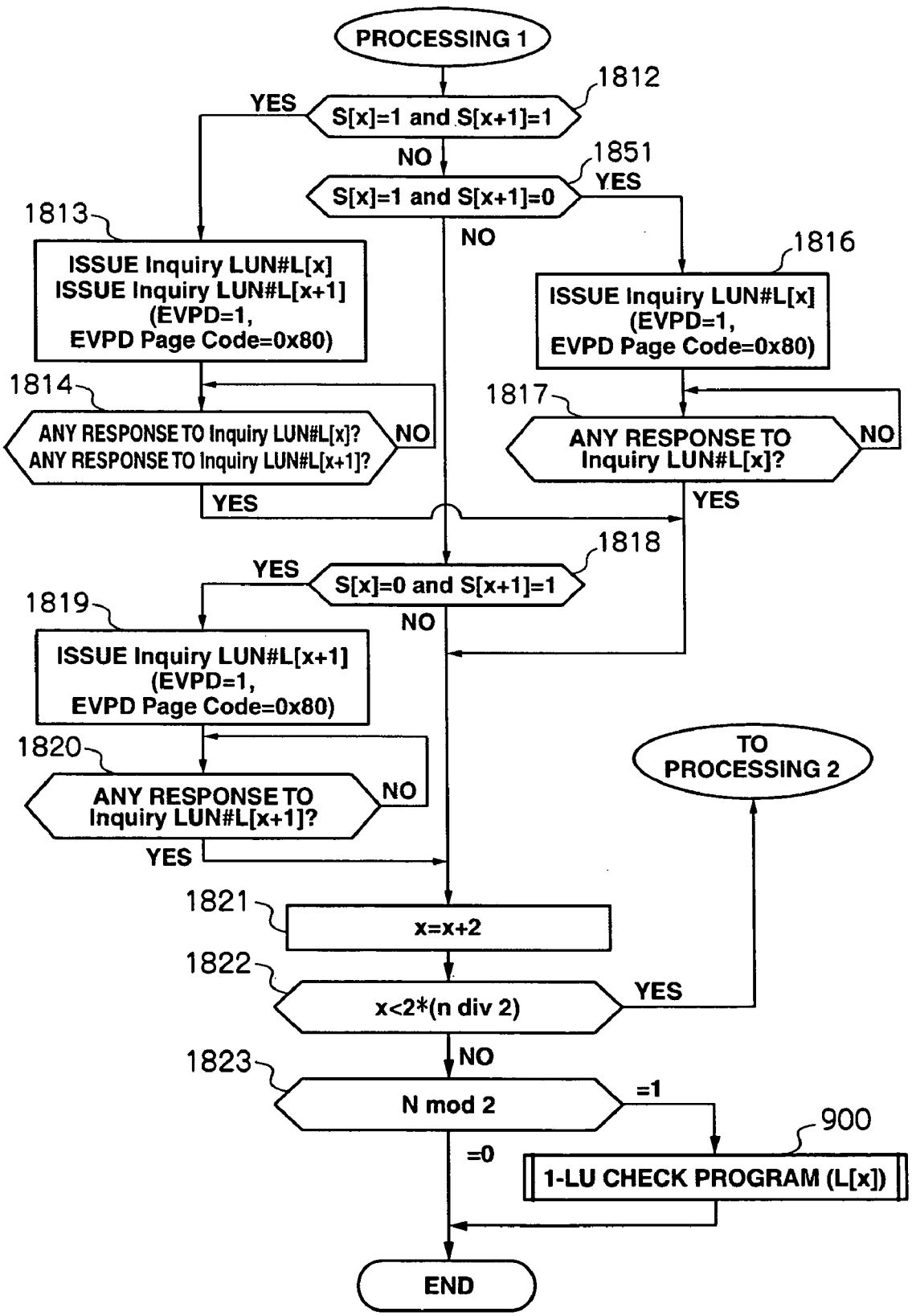
FIG. 19 is another flowchart of processing based on the LU check program according to Embodiment 3.

FIGS. 18 and 19 are flowcharts showing the processing where the initiator checks LUs based on the LU check program 109 according to Embodiment 3. First, the initiator obtains the LU lists as shown in FIG. 5 and stores the LU list numbers it in the lines L (step 500). Then, it also obtains EVPD support LU lists and stores the EVPD support LU list numbers in the lines D and lines S (step 1700). Then, if the number of delayed ACKs is set to one in the TCP/IP control 108c in the host computer 106 or in the TCP/IP control 108c in the interface controller 102 where the LU check program is executed (step 1801), it carries out step 1204 shown in FIG. 12 in the same way as in conventional techniques. However, if it is found in step 1801 that the number of delayed ACKs is set to two, the initiator substitutes 0 for a temporary variable (step 1802) and carries out step 1310 shown in FIG. 13. Then, if the line D[x]=1 and the line D[x+1]=1 (step 1803), the initiator issues to the target two Inquiry Commands where 1 is entered in each EVPD field 603 and 0x83 is entered in each Page Code field 604, designating the two LUNs indicated by the line L[x] and line L[x+1] (step 1804), and waits for two responses (step 1805).

After step 1803, if the line D[x]=1 and the line D[x+1]=0 (step 1806), the initiator issues to the target one Inquiry Command where 1 is entered in the EVPD field 603 and 0x83 is entered in the Page Code field 604, designating the LUN indicated by the line L[x] (step 1807), and waits for one response (step 1808). After step 1806, if the line D[x]=0 and the line D[x+1]=1 (step 1809), the initiator issues to the target one Inquiry Command where 1 is entered in the EVPD field 603 and 0x83 is entered in the Page Code field 604, designating the LUN indicated by the line L[x+1] (step 1810), and waits for one response (step 1811). Then, when the line S[x]=1 and the line S[x+1]=1 (step 1812), the initiator issues two Inquiry Commands where 1 is entered in each EVPD field 603 and 0x80 is entered in each Page Code field 604, designating the LUNs indicated by the line L[x] and line L[x+1] (step 1813) and waits for two responses (step 1814).

Meanwhile, next to step 1812, if the line S[x]=1 and the line S[x+1]=0 (step 1815), the initiator issues to the target one Inquiry Command where 1 is entered in the EVPD field 603 and 0x80 is entered in the Page Code field 604, designating the LUN indicated by the line L[x] (step 1816) and waits for one response (step 1817). Next to step 1815, if the line S[x]=0 and line S[x+1]=1 (step 1818), the initiator issues to the target one Inquiry Command where 1 is entered in the EVPD field and 0x80 is entered in the Page Code field 604, designating the LUN indicated by the line L[x+1] (step 1819), and waits for one response (step 1820).

As long as the variable x does not exceed the value obtained by multiplying the quotient resulting from dividing the number N of LUs by two (step 1822) by two, the initiator repeatedly increments the variable x by two (step 1821) and repeats step 1310 and steps 1803 to 1820. If inequality is not established in step 1822, the initiator carries out the processing shown in FIG. 9 (step 900) only if the remainder obtained from dividing the number N of LUs by two is one (step 1823). Incidentally, some points in FIG. 18 are surrounded by dotted lines and marked as steps 1851 and 1852 so as to be able to be used in the explanations below.

FIG. 20 shows an image of the order the initiator checks the respective items in the LU check table 110 in during the processing shown in FIGS. 18 and 19. The arrows show the order of steps in the processing and the initiator checks the items in the order shown by the arrows 1901 to 1907. The arrows 1901 and 1902 show the processing in step 1310 in FIG. 18 and the arrows 1903 and 1904 show the processing from steps 1803 to 1811 in FIG. 18. The arrows 1905 and 1906 show the processing in steps 1812 to 1820 in FIG. 19 and the arrow 1907 shows the processing in step 900 in FIG. 19.

According to Embodiment 3, if the initiator judges, based on the information obtained from the target that the number of ACKs is set to two or more and that different items are checked in each LU, it simultaneously issues, for each check item, check commands to the target, designating the same number of LUs as the number of ACKs, or LUs in multiples of the number of ACKs; and, sends an acknowledgement to the target when receiving the check results for all the LUs for each check item. Accordingly, during checking of the LUs in the target, the influence of the delayed ACK can be avoided as much as possible and an increase in check time can be prevented.

Embodiment 4

Embodiment 4 of this invention is explained below. This embodiment is different from Embodiment 3 in that, when a check target LU has either device identifier 1106 or unit serial number 1107 shown in FIG. 11, this LU is checked while checking whether another LU has a device identifier 1106 or unit serial number 1107.

Figure 21A:
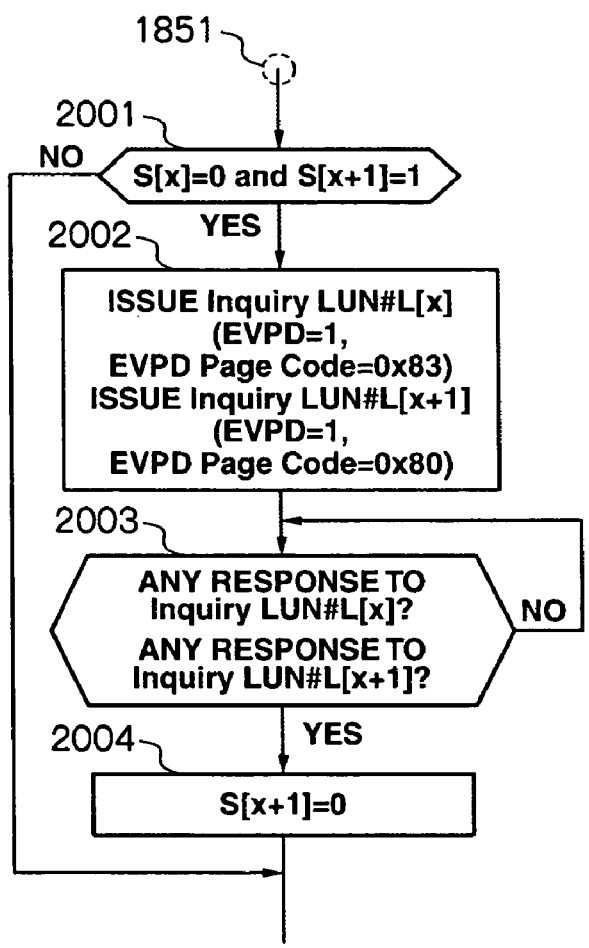
FIGS. 21(A) and 21(B) are flowcharts of processing based on the LU check program according to Embodiment 4, which have been added to the flowcharts of the processing according to Embodiment 3.
Figure 21B:
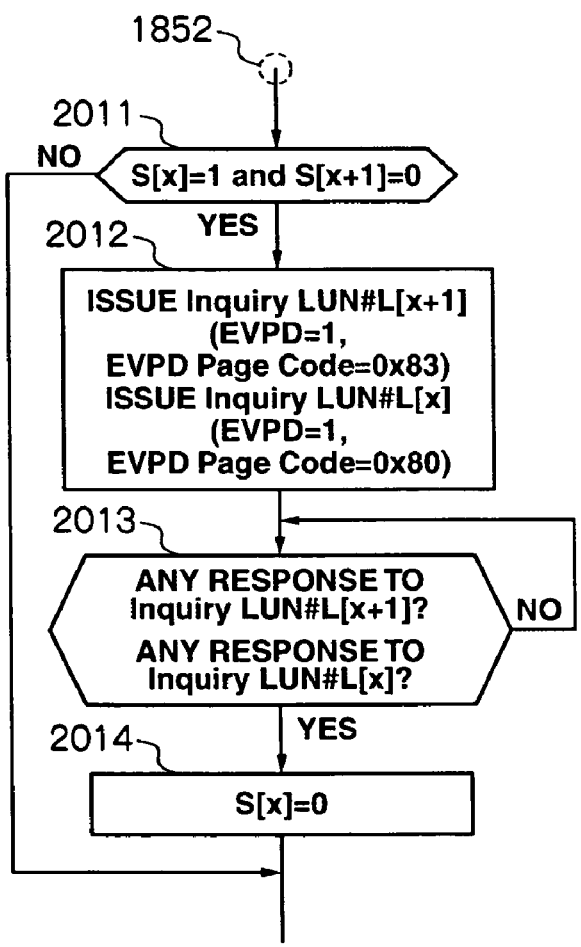

FIGS. 21(a) and 21(b) are flowcharts of the processing where the initiator checks LUs based on the LU check program 109 according to Embodiment 4. They only show the points different from Embodiment 3.

The following steps are added to step 1851 in FIG. 18. As shown in FIG. 21(a), when the line S[x]=0 and line S[x+1]=1 (step 2001), the initiator issues two commands simultaneously to the target: an Inquiry command where 1 is entered in the EVPD field 603 and 0x83 is entered in the Page Code field 604, designating the LUN indicated by the line L[x]; and an Inquiry Command where 1 is entered in the EVPD field 603 and 0x80 is entered in the Page Code field 604, designating the LUN indicated by the line L[x+1] (step 2002), and waits for two responses (step 2003). Then, although the line S[x+1]=1, checking is complete when an unfinished flag is set, so the initiator sets the line S[x+1] to 0 (step 2004).

The following steps are also added to step 1852 in FIG. 18. As shown in FIG. 21(b), when the line S[x]=1 and line S[x+1]=0 (step 2011), the initiator issues two commands simultaneously to the target: an Inquiry command where 1 is entered in the EVPD field 603 and 0x83 is entered in the Page Code field 604, designating the LUN indicated by the line L[x+1]; and an Inquiry Command where 1 is entered in the EVPD field 603 and 0x 80 is entered in the Page Code field 604, designating the LUN indicated by the line L[x] (step 2012), and waits for two responses (step 2013). Then, although the line S[x]=1, checking is complete when an unfinished flag is set, so the initiator sets the line S[x] to 0 (step 2014).

FIG. 22 shows an image of the order the initiator checks the respective items in the LU check table 110 in during the processing shown in FIGS. 18, 19 and 21. The arrows show the order of steps in the processing and the initiator checks the items in the order shown by the arrows 2101 to 2106. The arrows 2101 and 2102 show the processing in step 1310 in FIG. 18 and the arrow 2103 shows the processing from steps 1803 to 1805 in FIG. 18. The arrow 2104 shows the processing in step 1806 and steps 2001 to 2004 in FIG. 21. The arrow 2105 shows the processing in steps 1812 to 1820 in FIG. 19. The arrow 2106 shows the processing in step 900 in FIG. 19.

According to Embodiment 4, if the initiator judges, based on the information obtained from the target, that the number of delayed ACKs is set to two or more and that different items are checked in each LU, it simultaneously issues check commands to the target, designating the same number of LUs as the number of ACKs, or LUs in multiples of the number of ACKs, while combining item(s) to be checked in LU(s) with different item(s) to be checked in other LU(s); and, sends an acknowledgement to the target when receiving the results for all the LUs for each of the different check items. Accordingly, during checking of the LUs in the target, the influence of the delayed ACK can be avoided as much as possible and an increase in check time can be prevented.

Embodiment 5

Embodiment 5 of this invention is explained below. When the host computer 106a shown in FIG. 1 iSCSI-logs on to the storage system 101a or the storage system 101a iSCSI-logs into the storage system 101b, it has to carry out the processing to check the LUs in a target. Here, the checking methods based on the LU check program 109 explained in Embodiments 1 to 4 may be used (not shown in the drawing). According to Embodiment 5, because an initiator checks LUs also when it logs into a target, when the initiator uses a plurality of LUs, the login time can be reduced.

Embodiment 6

Embodiment 6 of this invention is explained below. Embodiments 1 to 5 are based on the premise that the number of delayed ACKs is set to two. However, depending on the mounting condition or configuration of TCP, that number may be any value other than two. In that case, the number of check commands to be issued simultaneously is set to the same number as the number of the delayed ACKs, or multiples of the number of delayed ACKs. The number of check commands to be issued simultaneously may be designated by an administrator or determined according to a control policy previously prepared.

Figure 23:
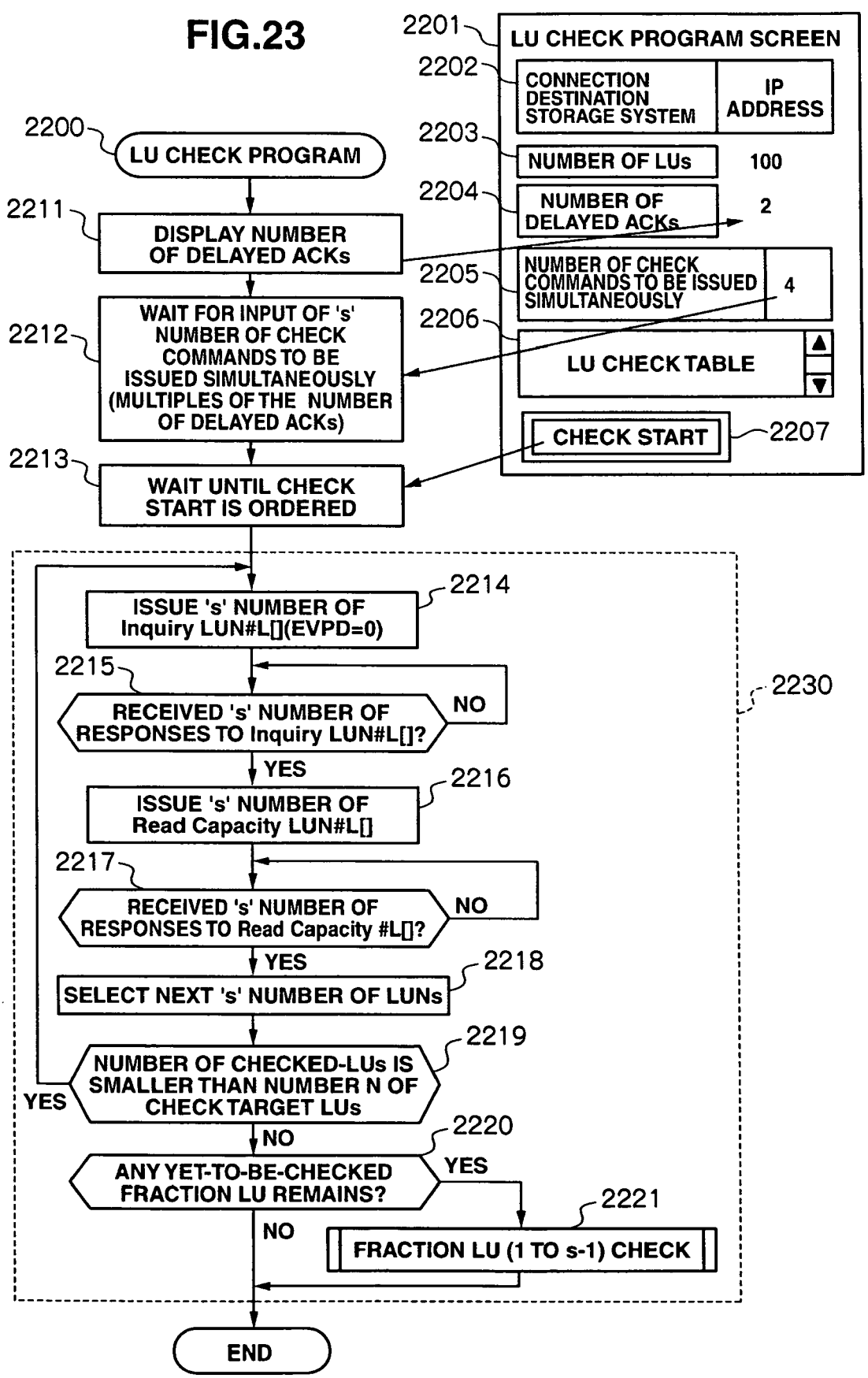
FIG. 23 is a flowchart of processing based on the LU check program according to Embodiment 6, this processing being performed when an administrator designates the number of check commands to be issued simultaneously.

An example where an administrator designates the number of check commands to be issued simultaneously is shown. FIG. 23 is a flowchart of processing where the administrator, having been informed of the number of delayed ACKs, designates the number of check commands to be issued simultaneously. An LU check program screen 2201 shows, for example, a connection destination storage system address designate section 2202, number-of-LUNs display section 2203, number-of-delayed ACKs display section 2204, number-of-simultaneously-issued-check commands input section 2205, LU check table display section 2206, and check start button 2207.

Although the LU check program 2200 itself is the same as that in Embodiment 1 shown in FIG. 13, the processing in Embodiment 6 is different from Embodiment 1 in the judgment of the number of delayed ACKs in step 1301 as well as in the issue of two Inquiry Commands in step 1303; i.e., in Embodiment 6, the number of commands issued is changed based on the value input in the number-of-simultaneously-issued-check commands input section 2205. The remainder of the processing is the same. When a value is input in the number-of-simultaneously-issued-check commands input section 2205, the program wait until a start command is input via the check start button 2207 (step 2213) and starts LU checking when the command is input.

In FIG. 23, if it is assumed that the number of LUs is one hundred, and that four check commands are issued simultaneously, because the number of LUs, a hundred, can be divided by four, there is no fraction, i.e., yet-to-be-checked LU(s), left in step 2220. In another example, where the number of LUs is ninety-nine, a fraction—three—remains, so the three remaining LUs are checked one by one (step 2221). Once the check starts, the results are displayed in the LU check table 2206. In some cases, commands for check interruption or restart may be made.

Figure 24:
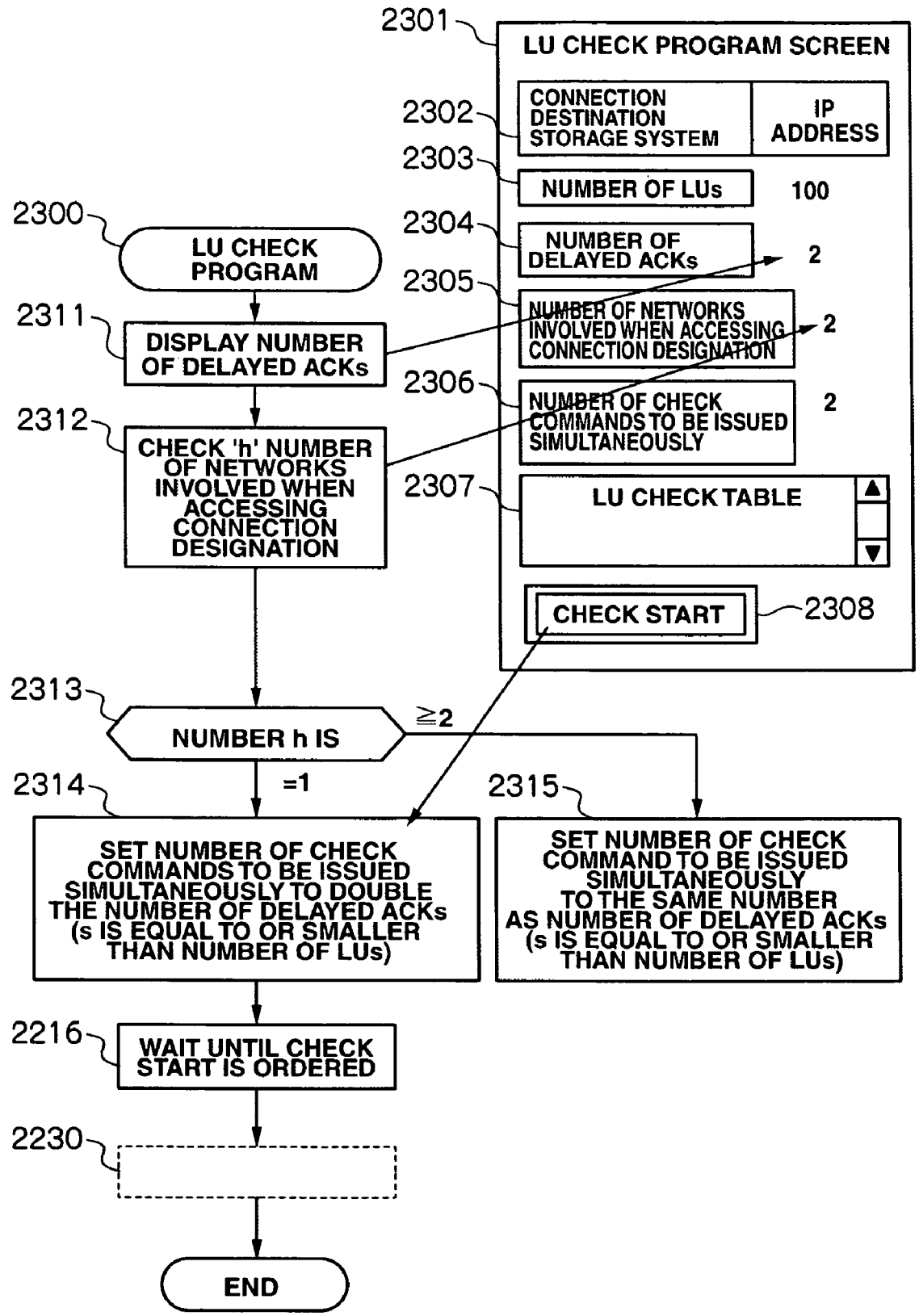
FIG. 24 is a flowchart of processing based on the LU check program according to Embodiment 6, this processing being performed when the number of check commands to be issued simultaneously is determined based on a control policy.

An example where the number of check commands to be issued simultaneously is determined according to a previously prepared control policy. FIG. 24 is a flowchart showing processing where the number of networks involved in the communication between an initiator and a target storage system is checked and, if that number is small, the number of check commands to be issued simultaneously is increased, but if that number is large, the number of check commands to be issued simultaneously is decreased. Here, it is assumed that the LU check program screen 2301 includes, for example, a connection destination storage system address designation section 2302, number-of-LUs display section 2303, number-of-delayed ACKs display section 2304, number-of-networks involved when communicating with the target display section 2305, number-of-simultaneously-issued check commands display section 2306, LU check table display section 2207, and check start button 2208.

Although the LU check program 2300 itself is the same as that shown in FIG. 23, the processing in FIG. 24 is different from that in FIG. 23 in the input of the number of check commands to be issued simultaneously in step 2212. Checking the number h of networks involved when communicating with a connection destination (step 2312) is carried out by a commonly used traceroute command. Tracerouting enables the finding out of the number of network routers and their addresses and this number is displayed in the number-of-networks section 2305. Whether the variable h is one or two or more is checked (step 2313), and if it is one, the number s of check commands to be issued simultaneously is set to, e.g., double the number of delayed ACKs (step 2314). Here, the variable s has to be equal to or smaller than the number of LUs. If the variable h is 2 or more, the number s of check commands to be issued simultaneously is set to, e.g., the same number as the number of delayed ACKs (step 2315).

According to this control policy, if there are few networks, the distance between a source and destination is judged as being short and the number of check commands to be issued simultaneously is increased, meanwhile, if there are many networks, the distance is judged as being long and the number of check commands to be issued simultaneously is decreased. A start command input from the check start button 2208 is waited for (step 2216), and the step 2230 composed of a series of steps shown in FIG. 23 is then carried out. Once the check is started, the results are displayed in the LU check table 2307. In some cases, commands for check interruption or restart may be made. In another example, the control policy may alternatively have a different setting where the response time from a connection destination is checked instead of checking the number of networks involved when communicating with the destination, and if the response time from the connection destination is short, the distance is judged as being short, but if the response time is long, the distance is judged as being long.

This invention is not limited to the foregoing embodiments and may also be used as follows:

(1) In Embodiments 1 to 6, when it is judged that the number of delayed ACKs is one, an LU check is carried out in the conventional manner. However, in addition to the case where the number of delayed ACKs is set to one, there are also cases where, depending on the enablement/configuration of TCP, the delayed ACKs may not be set or set to "OFF," or the delayed ACK may not be employed in TCP. Accordingly, when it is judged that the delayed ACK is not employed, the processing may be carried out in the appropriate way for the enablement/configuration of that TCP.

(2) With the LU check program according to Embodiments 1 to 6, the LU lists and EVPD support lists obtained in steps 500 and 1700 respectively may be displayed on the screen of the host computer or the management terminal of the storage system so that the administrator can select LU(s) to check from the lists and issue check commands.

(3) With the LU check program according to Embodiments 1 to 6, the administrator can choose, on the host computer or the management terminal of the storage system, whether to implement this invention or not and, if the administrator chooses to do so, he/she can choose any one of Embodiments 1 to 6. Also, when there are more than one storage systems that become connection targets for the host computer or storage system, the administrator can make the above choices for each connection target storage system.

What is claimed is:

1. A storage system coupled to a host computer via an IP network and including a storage unit storing data, comprising:
   a communication controller—(an initiator)—configured to communicate with another storage system—(a target)—via the IP network using iSCSI protocol, and to send one or more check commands to the other storage system for checking information of one or more logical units in the other storage system,
   wherein, the communication controller is configured to simultaneously send to the target a plurality of check commands, wherein when a number of delayed ACKs for delaying responses to the target is set to more than one, the number of the plurality of check commands is set to the same number of the delayed ACKs, or set to a multiple number of the delayed ACKs;
   wherein when the number of delayed ACKs for delaying responses to the target is set to one, the number of the check command is one;
   wherein when receiving check results in response to the check commands from the target, the communication controller is configured to send an ACK to the target, and when no check result has been received, then the communication controller waits for an inquiry response; and
   wherein the communication controller is configured to increase or decrease the number of the plurality of check commands to be sent simultaneously on the basis of the number of networks existing between the communication controller and the target.

2. The storage system according to claim 1, wherein when there is a plurality of types of check commands, the communication controller repeats the processing to issue various types of commands simultaneously within the range of the foregoing types of check commands, designating the plurality of logical units.

3. The storage system according to claim 1, wherein when there is a plurality of types of check commands, the communication controller repeats the processing to simultaneously issue various types of check commands within the range of the foregoing types of check commands, designating the plurality of logical units, and then repeats the processing to simultaneously issue the various types of check commands to a different plurality of logical units other than the foregoing plurality of logical units, thereby checking all the logical units.

4. The storage system according to claim 1, wherein when there is a plurality of types of check commands, the communication controller repeats the processing to simultaneously issue first type check commands, designating the plurality of logical units, and after all the check-target logical units have been checked, it repeats the processing to simultaneously issue second type check commands, designating the plurality of logical units, and thereby repeatedly checking all the check-target logical units within the range of the foregoing types of check commands.

5. The storage system according to claim 1, wherein when the communication controller judges, based on the information obtained from the target, that the number of delayed ACKs is set to two or more and that the same items are checked in each logical unit, it simultaneously issues check commands to the target, designating the same number of logical units as the number of delayed ACKs or logical units in multiples of the number of delayed ACKs and, sends an acknowledgement to the target when receiving the check results for all the check items for each logical unit.

6. The storage system according to claim 1, wherein when the communication controller judges, based on the information obtained from the target, that the number of delayed ACKs is set to two or more and that the same items are checked in each logical unit, it simultaneously issues, for each check item, check commands to the target, designating the same number of logical units as the number of delayed ACKs or logical units in multiples of the number of delayed ACKs and, sends an acknowledgement to the target when receiving the check results for all the logical units for each check item.

7. The storage system according to claim 1 wherein, when the communication controller judges, based on the information obtained from the target, that the number of ACKs is set to two or more and that different items are checked in each logical unit, it simultaneously issues check commands to the target, designating the same number of logical units as the number of delayed ACKs, or logical units in multiples of the number of delayed ACKs, while combining item(s) to be checked in logical unit(s) with different item(s) to be checked in other logical unit(s); and, sends an acknowledgement to the target when receiving the results for all the logical units for each of the different check items.

8. The storage system according to claim 1 wherein, after the communication controller logs into the target, it issues a check command to the target.

9. The storage system according to claim 1, wherein the communication controller increases or decreases the number of check commands to be issued simultaneously, in accordance with an input instruction.

10. A logical unit checking method performed in a storage system to enable, in the situation where a plurality of storage systems having storage units for storing data communicate with one another via an IP network using iSCSI protocol, one storage system to check a logical unit in another storage system, wherein the foregoing one storage system—(an initiator)—obtains the information for a check-target logical unit from the other storage system—(a target)—; simultaneously issues, when it judges, based on the obtained information, that the number of delayed ACKs for delaying responses to the target is set to more than one, it sets the same number of check commands as the number of delayed ACKs, or it sets check commands in multiples of the number of delayed ACKs to the other storage system;
   wherein when the number of delayed ACKs for delaying responses to the target is set to one, the number of the check command is one;
   when receiving check results in response to the check commands from the target, sends an acknowledgement to the target, and when no check result has been received, then the communication controller waits for an inquiry response; and
   further comprising increasing or decreasing the number of the plurality of check commands to be sent simultaneously on the basis of the number of networks existing between the communication controller and the target.

11. The logical unit checking method performed in a storage system according to claim 10, wherein when the initiator judges, based on the information obtained from the target, that the number of delayed ACKs is set to two or more and that the same items are checked in each logical unit, it simultaneously issues check commands to the target, designating the same number of logical units as the number of delayed ACKs, or logical units in multiples of the number of delayed ACKs and, sends an acknowledgement to the target when receiving the check results for all the check items for each logical unit.

12. The logical unit checking method performed in a storage system according to claim 10, wherein when the initiator judges, based on the information obtained from the target, that the number of delayed ACKs is set to two or more and that the same items are checked in each logical unit, it simultaneously issues, for each check item, check commands to the target, designating the same number of logical units as the number of delayed ACKs, or logical units in multiples of the number of delayed ACKs and, sends an acknowledgement to the target when receiving the check results for all the Logical units for each check item.

13. The logical unit checking method performed in a storage system according to claim 10, wherein when the initiator judges, based on the information obtained from the target, that the number of ACKs is set to two or more and that the check items are different for each logical unit, it simultaneously issues check commands to the target, designating the same number of logical units as the number of delayed ACKs, or logical units in multiples of the number of delayed ACKs, while combining item(s) to be checked in logical unit(s) with different item(s) to be checked in other logical unit(s); and, sends an acknowledgement to the target when receiving the results for all the logical units for each of the different check items.

14. A host computer connected via an IP network to a storage system having a storage unit for storing data, and communicating with the storage system using iSCSI protocol, comprising
  a communication controller for carrying out processing for the storage system—(a target)—based on a logical unit check program to check a logical unit in the storage system,
  wherein, the communication controller—(an initiator)—is configured for: obtaining from the target information for a check-target logical unit; and simultaneously issuing to the target, when it is judged, based on the obtained information, that the number of delayed ACKs for delaying responses to the target is set to more than one, the same number of check commands as the number of delayed ACKs, or check commands in multiples of the number of delayed ACKs;
  wherein when the number of delayed ACKs for delaying responses to the target is set to one, the number of the check command is one;
  and, when receiving check results in response to the check commands from the target, sending an acknowledgment to the target, and when no check result has been received, then the communication controller waits for an inquiry response; and
  wherein the communication controller is configured to increase or decrease the number of the plurality of check commands to be sent simultaneously on the basis of the number of networks existing between the communication controller and the target.

15. The host computer according to claim 14, wherein when the communication controller judges, based on the information obtained from the target, that the number of delayed ACKs is set to two or more and that the same items are checked in each logical unit, it simultaneously issues check commands to the target, designating the same number of logical units as the number of delayed ACKs, or logical units in multiples of the number of delayed ACKs and, sends an acknowledgement to the target when receiving the check results for all the check items for each logical unit.

16. The host computer according to claim 14, wherein when the communication controller judges, based on the information obtained from the target, that the number of delayed ACKs is set to two or more and that the same items are checked in each logical unit, it simultaneously issues, for each check item, check commands to the target, designating the same number of logical units as the number of delayed ACKs, or logical units in multiples of the number of delayed ACKs and, sends an acknowledgement to the target when receiving the check results for all the logical units for each check item.

17. The host computer according to claim 14, wherein when the communication controller judges, based on the information obtained from the target, that the number of ACKs is set to two or more and that different items are checked in each logical unit, it simultaneously issues check commands to the target, designating the same number of logical units as the number of delayed ACKs, or logical units in multiples of the number of delayed ACKs, while combining the check item(s) to be checked in logical unit(s) with different item(s) to be checked in other logical unit(s); and, sends an acknowledgement to the target when receiving the results for all the logical units for each of the different check items.

18. The host computer according to claim 14, wherein, after the communication controller logs on to the target, it issues a check command to the target.

19. The host computer according to claim 14, wherein the communication controller increases or decreases the number of check commands to be issued simultaneously, in accordance with an input instruction.

20. A logical unit checking method performed in a host computer to check, in the situation where the host computer is connected to a storage system having a storage unit for storing data via an IP network and communicates with the storage system using iSCSI protocol, a logical unit in the storage system,
  wherein the host computer—(an initiator)—obtains the information for a check-target logical unit from the storage system—(a target)—; simultaneously issues, when it judges, based on the obtained information, that the number of delayed ACKs for delaying responses to the target is set to more than one, the same number of check commands as the number of delayed ACKs, or check commands in multiples of the number of delayed ACKs to the storage system;
  wherein when the number of delayed ACKs for delaying responses to the target is set to one, the number of the check command is one; and,
  when receiving check results in response to the check commands from the target, sends an acknowledgement to the target, and when no check result has been received, then the communication controller waits for an inquiry response; and
  further comprising increasing or decreasing the number of the plurality of check commands to be sent simultaneously on the basis of the number of networks existing between the communication controller and the target.

21. The logical unit checking method performed in a host computer according to claim 20, wherein when the communication controller judges, based on the information obtained from the target, that the number of delayed ACKs is set to two or more and that the same items are checked in each logical unit, it simultaneously issues check commands to the target, designating the same number of logical units as the number of delayed ACKs, or logical units in multiples of the number of delayed ACKs and, sends an acknowledgement to the target when receiving the check results for all the check items for each logical unit.

22. The logical unit checking method performed in a host computer according to claim 20, wherein when the communication controller judges, based on the information obtained from the target, that the number of delayed ACKs is set to two or more and that the same items are checked in each logical unit, it simultaneously issues, for each check item, check commands to the target, designating the same number of logical units as the number of delayed ACKs, or logical units in multiples of the number of delayed ACKs and, sends an acknowledgement to the target when receiving the check results for all the logical units for each check item.

23. The logical unit checking method performed in a host computer according to claim 20, wherein when the communication controller judges, based on the information obtained from the target, that the number of ACKs is set to two or more and that the check items are different for each logical unit, it simultaneously issues check commands to the target, designating the same number of logical units as the number of delayed ACKs, or logical units in multiples of the number of delayed ACKs, while combining item(s) to be checked in logical unit(s) with different items to be checked in other logical unit(s); and, sends an acknowledgement to the target when receiving the results for all the logical units for each of the different check items.

* * * * *